United States Patent [19]

Bachmann

[11] 4,359,016
[45] Nov. 16, 1982

[54] INTERNAL COMBUSTION ENGINE

[76] Inventor: William V. Bachmann, 22517 Ten Mile Rd., St. Clair Shores, Mich. 48080

[21] Appl. No.: 246,422

[22] Filed: Mar. 23, 1981

Related U.S. Application Data

[62] Division of Ser. No. 66,475, Aug. 13, 1979, Pat. No. 4,285,304.

[51] Int. Cl.³ .............................................. F02B 75/18
[52] U.S. Cl. ................................ 123/52 B; 123/52 A
[58] Field of Search ................. 123/52 A, 52 B, 51 R, 123/197 AC

[56] References Cited

U.S. PATENT DOCUMENTS

| | | | |
|---|---|---|---|
| 1,176,207 | 3/1916 | Dempsey | 123/73 CC |
| 1,309,891 | 7/1919 | Griffith | 123/52 B |
| 3,134,373 | 5/1964 | Schauer | 123/51 BA |
| 4,043,301 | 8/1977 | Rheingold | 123/52 B |
| 4,285,304 | 8/1981 | Bachman | 123/52 B |

Primary Examiner—Ronald B. Cox
Attorney, Agent, or Firm—Lon H. Romanski

[57] ABSTRACT

An internal combustion engine is shown as including an annular or ring type cylinder and reciprocating piston therein, exhaust ports from the cylinder lead to an afterburner section situated generally medially of the annular cylinder; the exhaust gases from the annular cylinder are further burned in the afterburner section, at least one crankshaft is employed for connection as through connecting rods to the reciprocating piston; in one form a single crankshaft is employed and sliding guides are employed for precluding the occurrence of piston slap while in another form two parallel carankshafts are employed with both crankshafts being connected to the same piston; the crankshafts are shown as having large live bearing surfaces journalled in the cooperating portion of the engine housing.

9 Claims, 40 Drawing Figures

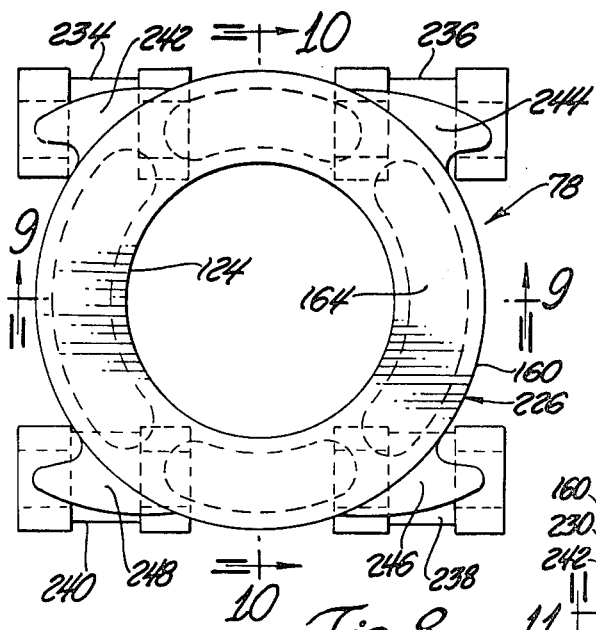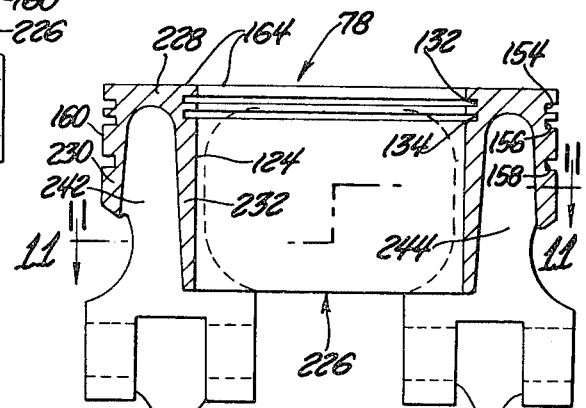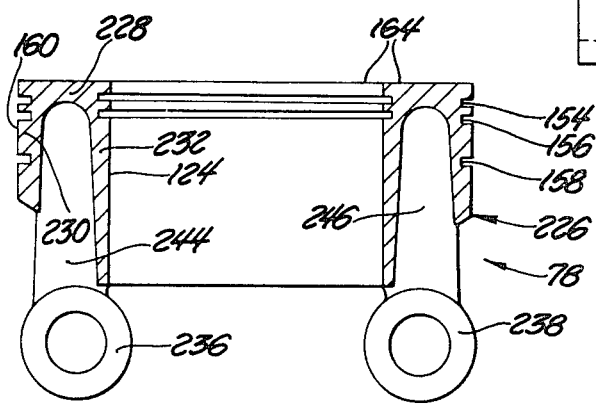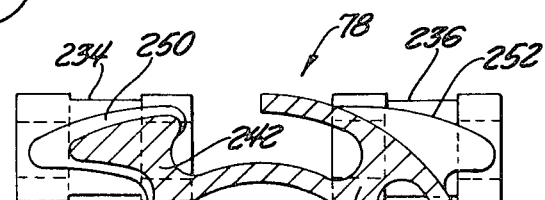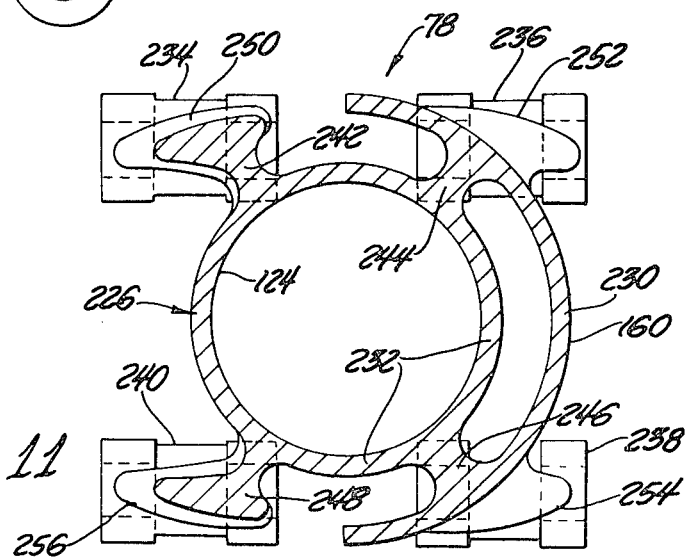

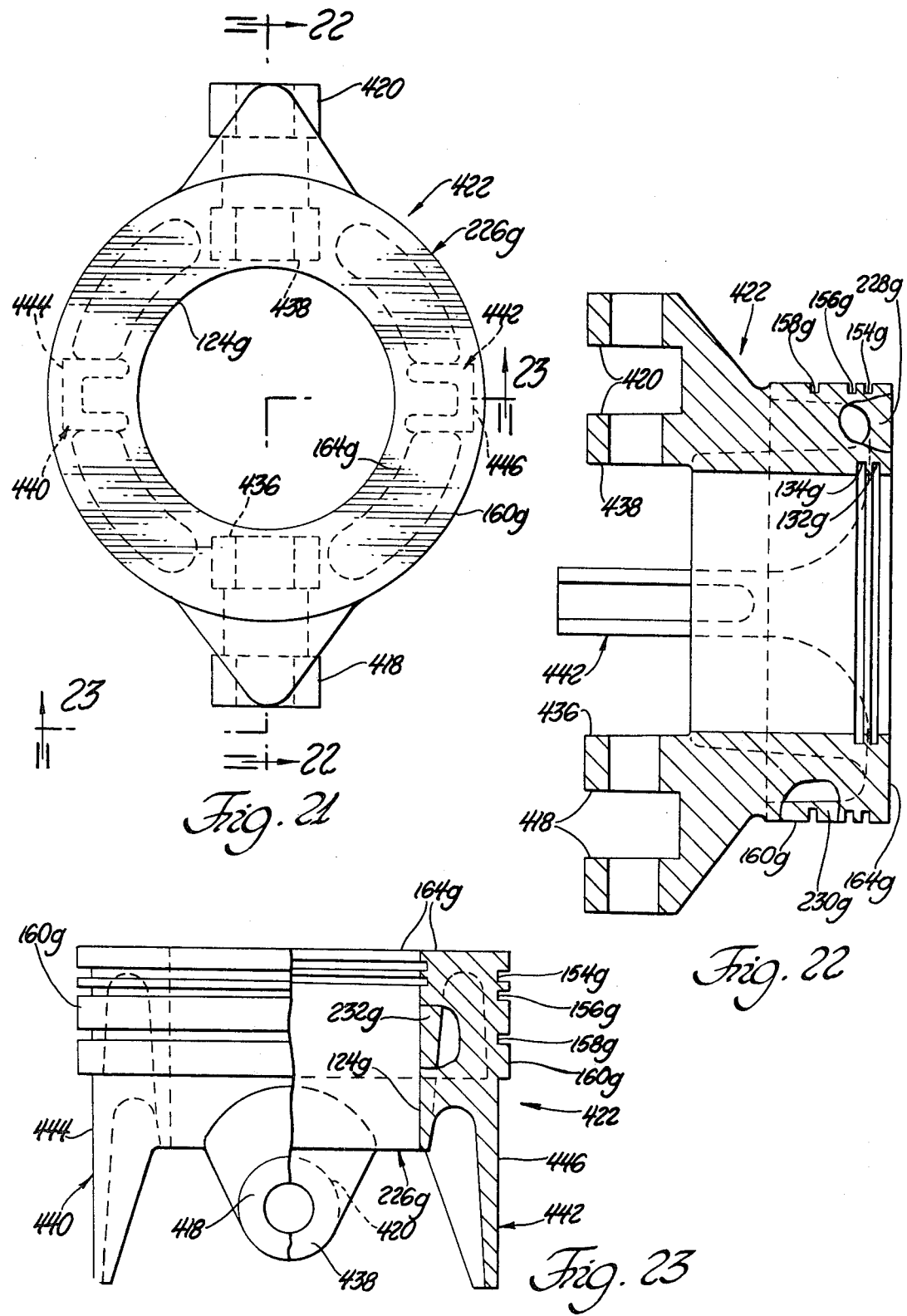

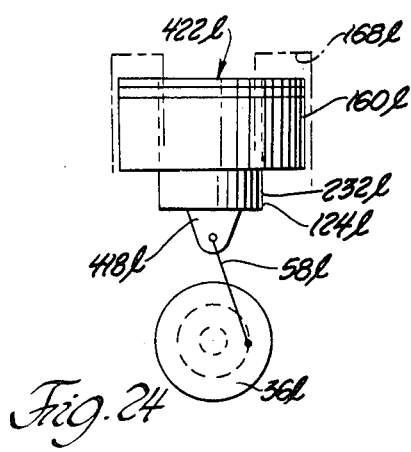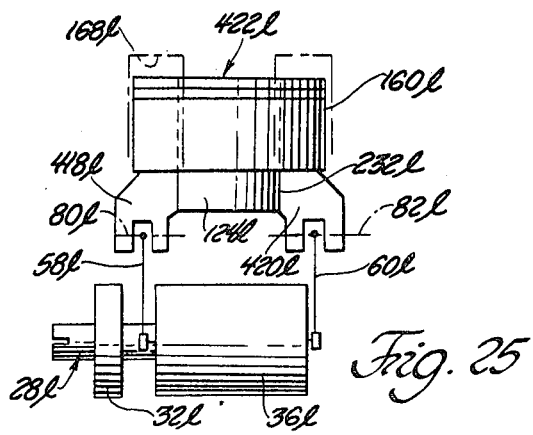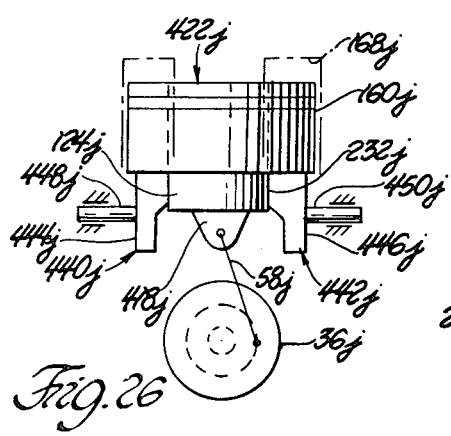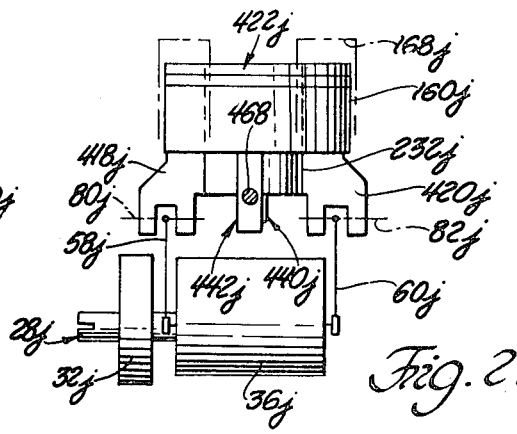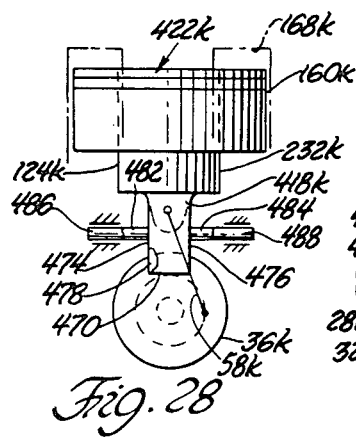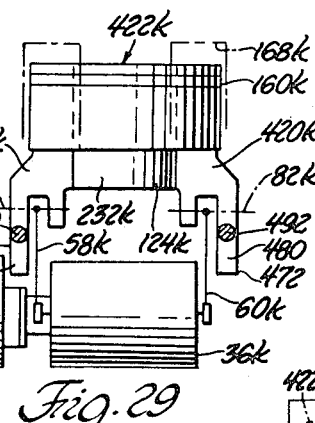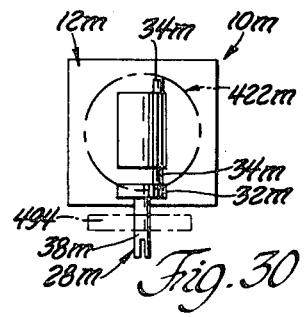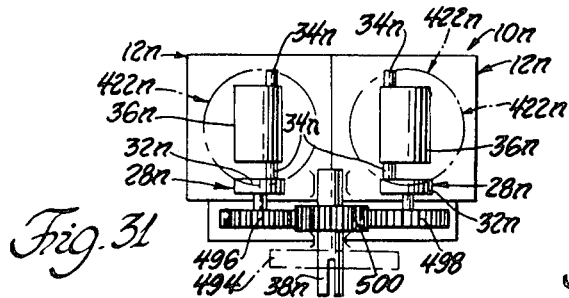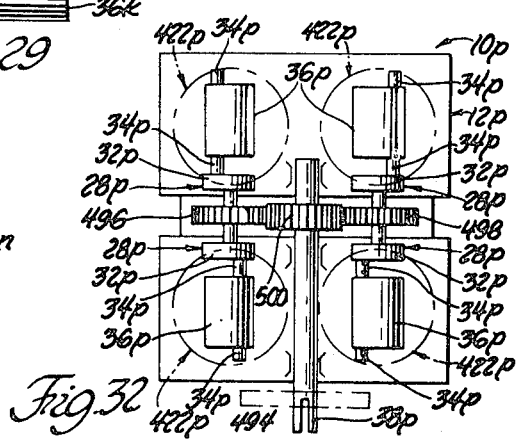

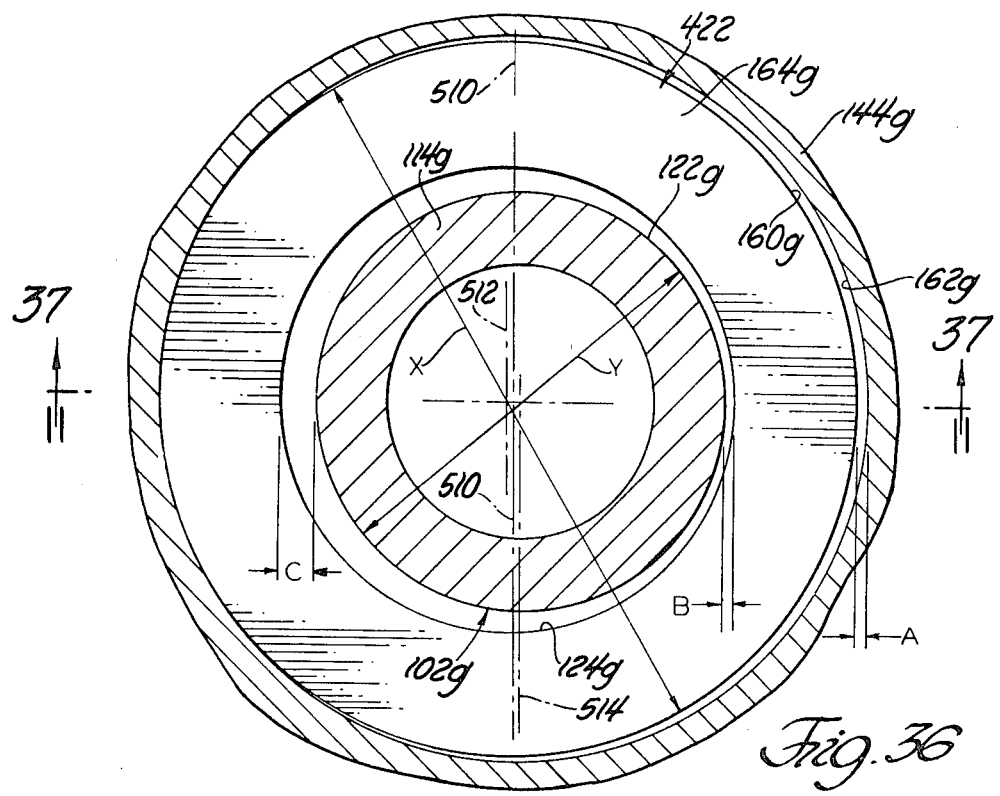
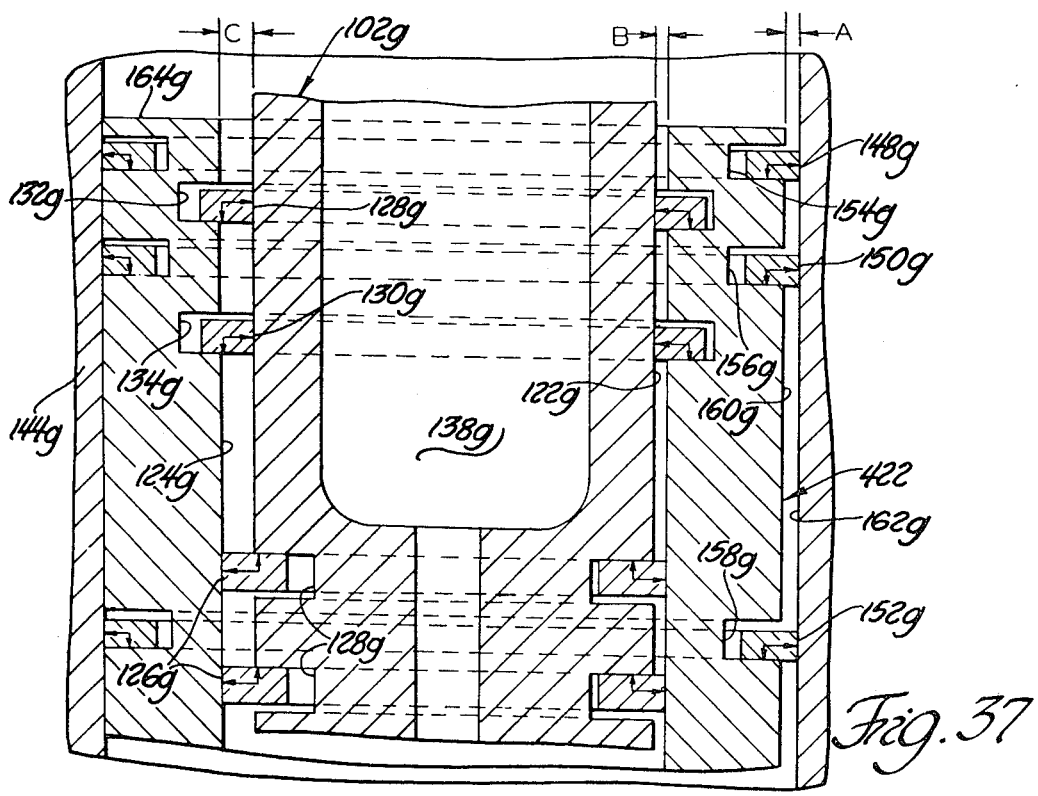

4,359,016

INTERNAL COMBUSTION ENGINE

This is a division of application Ser. No. 066,475, filed Aug. 13, 1979, now U.S. Pat. No. 4,285,304.

FIELD OF INVENTION

This invention relates generally to internal combustion engines and more particularly to internal combustion engines of the type employing an annular or ring-type piston reciprocatingly received within a cooperating annular or ring-type cylinder.

BACKGROUND OF THE INVENTION

Heretofore various forms of ring-type piston engines have been proposed by the prior art. Among other things, the structures proposed by the prior art present problems in construction as well as some problems of wear of cooperating components. Accordingly, the invention as herein disclosed and claimed is primarily directed to the solution of such and other related and attendant problems.

SUMMARY OF THE INVENTION

According to the invention, an internal combustion engine comprises an engine housing, an annular cylinder including a combustion chamber formed in said housing, said annular cylinder comprising a first radially inner annular wall and a second radially outer wall, a ring-like piston received in said annular cylinder for reciprocating movement therein, and motion transmitting means operatively connected to said ring-like piston for transmitting the reciprocating movement of said ring-like piston to associated power output means, said motion transmitting means comprising crankshaft means and at least two connecting rods operatively interconnecting said crankshaft means and said ring-like piston, said crankshaft means comprising a large diameter live bearing situated axially between said connecting rods and journalled in said engine housing.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for the purpose of clarity certain details and/or elements may be omitted from one or more views:

FIG. 8 is a top plan view of the piston means shown in FIGS. 1, 5, 6 and 7;

FIG. 9 is a cross-sectional view, taken generally on the plane of line 9—9 of FIG. 8 and looking in the direction of the arrows;

FIG. 10 is a cross-sectional view taken generally on the plane of line 10—10 of FIG. 8 and looking in the direction of the arrows;

FIG. 11 is a cross-sectional view taken generally on the plane of line 11—11 of FIG. 9 and looking in the direction of the arrows;

FIG. 21 is a top plan view of the piston means shown in FIGS. 17 and 18;

FIG. 22 is a cross-sectional view taken generally on the plane of line 22—22 of FIG. 21 and looking in the direction of the arrows;

FIG. 23 is a partial cross-sectional and partial elevational view taken generally on the plane of line 23—23 of FIG. 21 and looking in the direction of the arrows;

FIG. 24 is a somewhat schematic representation of the type of piston means as basically shown in FIG. 18, but without any anti-side thrust guide extensions;

FIG. 25 is a somewhat schematic representation of the type of piston means as basically shown in FIG. 17, but without any anti-side thrust guide extensions;

FIG. 26 is a somewhat schematic representation of the type of piston means as basically shown in FIG. 18 with a pair of anti-side thrust guides and stabilizing means;

FIG. 27 is a somewhat schematic representation of the type of piston means as basically shown in FIG. 17 with a pair of anti-side thrust guides and stabilizing means;

FIG. 28 is a somewhat schematic representation of the type of piston means as basically shown in FIG. 18 with a pair of anti-side thrust guides and stabilizing means, whereby the anti-side thrust guides are an integral part of the wrist pin bearings;

FIG. 29 is a somewhat schematic representation of the type of piston means as basically shown in FIG. 17 with a pair of anti-side thrust guides and stabilizing means, wherein the extension of at least one wrist pin bearing half of each pair of wrist pin bearings is shaped as an anti-side thrust portion;

FIG. 30 is a somewhat schematic representation of a single cylinder engine employing the output shaft means as shown in FIGS. 17 and 18;

FIG. 31 is a generally schematic representation of an engine of the invention having two cylinders operatively connected by means of suitable gearing means toward a common output shaft;

FIG. 32 is a generally schematic representation of an engine of the invention having four cylinders operatively connected through related gearing means and toward a common output shaft;

FIG. 36 is a generally schematic top plan view of the typical annular or ring piston, of the invention, within the confines of the outer cylinder wall and the inner cylinder wall reflecting a tolerance disposition, whereby the diametrical tolerance of all four diameters involved are predetermined so that contact between the inner cylinder wall and the inner piston wall during operation is impossible;

FIG. 37 is a cross-sectional view taken generally on the plane of line 37—37 of FIG. 36 and looking in the direction of the arrows;

DETAILED DESCRIPTION OF THE PREFERRED EMBODIMENTS

Figure 1:
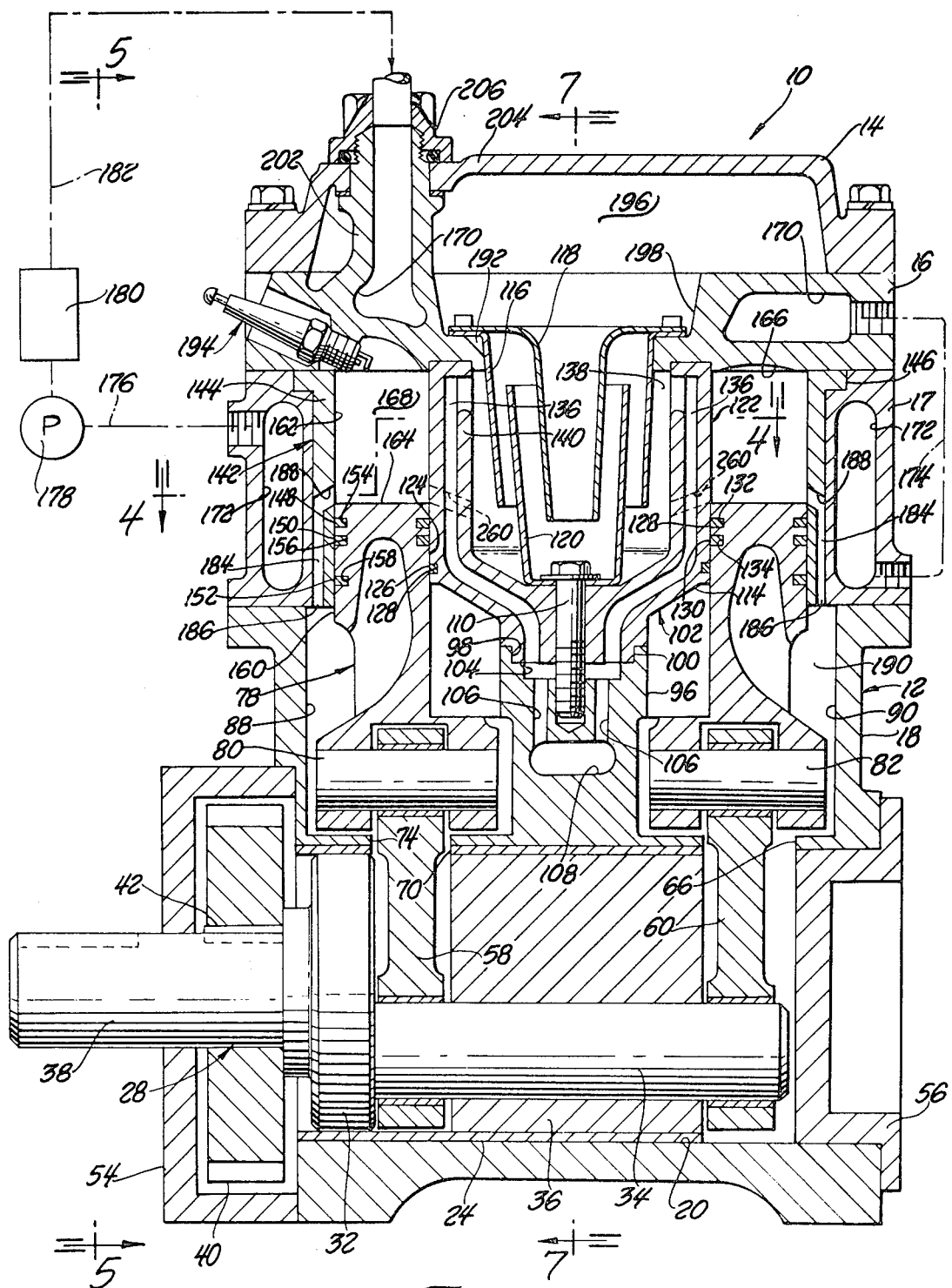
FIG. 1 is a generally elevational cross-sectional view of an engine constructed as to employ teachings of the invention.

Referring now in greater detail to the drawings, FIGS. 1, 2, 3, 4 and 5 and FIGS. 9, 10 and 11 illustrate, in somewhat simplified form, an engine 10 embodying teachings of the invention. As generally depicted, engine 10 is shown as comprising engine housing means 12 which, in turn, is preferably comprised of housing sections or portions 14, 16, 17 and 18 suitably fixedly secured to and through each other as by any suitable securing means.

The lower disposed engine housing section 18 also may serve as the engine crankshaft housing and, as such, is provided with bores 20 and 22 respectively receiving therein one-piece type bearings or journals 24 and 26 which rotatingly support respective engine crankshafts 28 and 30 which, in the preferred embodiment are counter-rotating. Crankshaft 28 is preferably provided with a first journal portion 32 which is rotatably supported in bearing 24 and an integrally formed eccentric or throw shaft portion 34 which, in turn, is rotatably received through an eccentrically disposed passageway formed in an intermediate rotatable journal member 36 received within bearing 24. An output shaft portion 38 of crank 28 is preferably provided with gear means 40 suitably secured thereto as by key means 42. Similarly, crankshaft 30 is preferably provided with a first journal portion 44 which is rotatably supported in bearing 26 and an integrally formed eccentric or throw shaft portion 46 which, in turn, is rotatably received through an eccentrically disposed passageway formed in a second intermediate rotatable journal member 36 received in bearing 26. An output shaft portion 50 of crank 30 is similarly preferably provided with gearing means 52 fixedly secured thereto and in operative engagement with gear means 40. Suitable gear housing or cover means 54 serves to enclose the gear means 40 and 52; a second closure member 56 may be provided as at the opposite ends of the cranks 28 and 30 with such cover or closure means 54 and 56 also serving to form an internal chamber as for the containment of a suitable supply of a lubricant.

A first pair of connecting rods 58 and 60 are journalled at their respective one ends to crankshaft throw 34 while a second pair of connecting rods 62 and 64 are similarly journalled at their respective one ends to crankshaft throw 46. Connecting rods 60 and 64, each being situated beyond the axial end of respective bearings 24 and 26, extend upwardly through respective openings 66 and 68 formed in lower engine housing section 18. However, connecting rods 58 and 62, not being situated beyond the axial ends of bearings 24 or 26, extend upwardly through respective arcuate clearance slots 70 and 72 formed in bearings 24 and 26 as well as generally juxtaposed respective openings 74 and 76 formed in engine housing section 18. The upper ends of connecting rods 58, 60, 62 and 64 are connected to an annular piston 78 as by wrist pins 80, 82, 84 and 86, respectively.

The lower or crank housing 18 is preferably provided with four pocket-like recesses 88, 90, 92 and 94 which provide for clearance for portions of the piston 78 as when such reaches a position of bottom-dated-center (BDC) of its travel. Generally centrally of crank housing section 18, a generally upwardly extending portion 96 is provided with such having an effective outer diameter significantly smaller than the inner diameter of the annular piston 78. The upper end of riser portion 96 is preferably provided with an annular counterbore 98 effective for receiving therein, in a mating manner, the lower end 100 of related afterburner means 102 which, when assembled as depicted, may result in a chamber-like portion 104. A plurality of generally vertically extending conduit means 106 serve to complete communication as between such chamber portion 104 and a passageway or conduit 108 formed as in engine housing section 18. The afterburner means 102 may be secured to riser 96 as by a suitable bolt 110 threadably engaged as in tapped hole 112 of riser 96.

In the preferred embodiment, the afterburner means 102 comprises a generally centrally disposed main body 114 and a plurality of generally telescoping but spaced guide or flow directing members 116, 118 and 120 with members 116 and 118 being generally tubular and fixedly secured at their respective upper ends as to engine housing section 16 while member 20 may be of cup-like configuration and fixedly secured to the main afterburner body as by the bolt or screw 110.

The afterburner main body 114, as viewed in FIG. 1, is of a somewhat cup-like configuration and has an outer cylindrical wall surface 122 which is juxtaposed to the inner diameter or wall 124 of the annular piston 78 as the piston 78 reciprocates therealong. A first piston sealing ring 126, of the type resiliently urging radially outwardly, is retained in an annular groove 128 formed as at a lower end of afterburner cylindrical surface 122. Such sealing ring 126 serves to further prevent gas leakage from the combustion chamber and past the piston 78.

A pair of piston rings 128 and 130 are respectively carried within annular grooves 132 and 134 formed in the inner diameter wall 124 of piston 78. Piston rings 128 and 130 are of the type which exhibit a radially inwardly directed resilient force as to thereby resiliently urged against and in contact with outer cylindrical surface 122 of afterburner body 114. It should be noted that when piston 78 is at BDC, piston rings 128 and 130 are above piston ring 126 carried by afterburner body 114.

Figure 4:
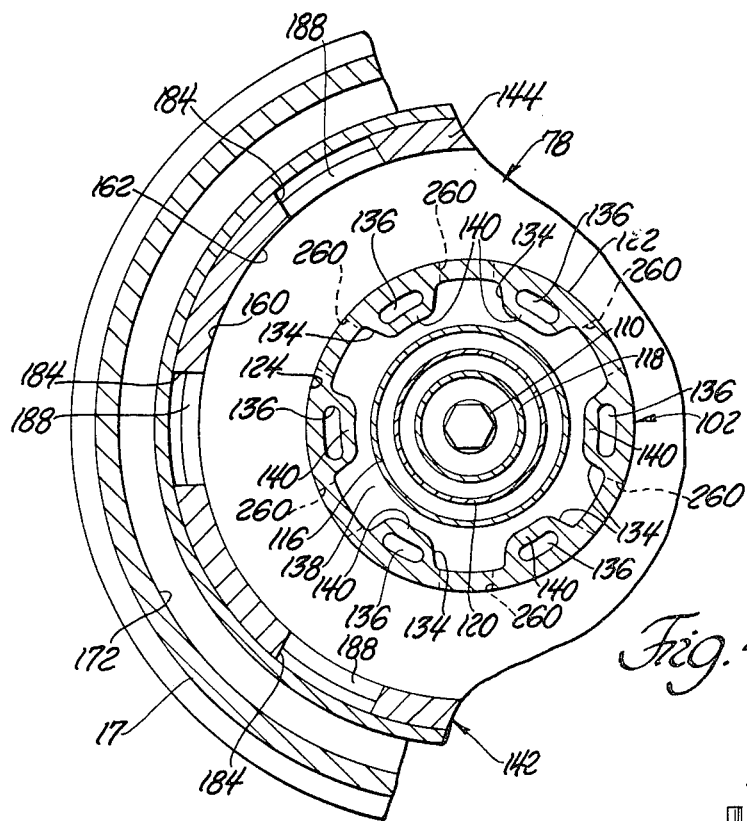
FIG. 4 is a fragmentary cross-sectional view taken generally on the plane of line 4—4 of FIG. 1 and looking in the direction of the arrows.

As also shown in FIG. 4, the afterburner body 114 is provided with a plurality of relatively thickened wall portions 134 each of which contains a passage or conduit 136 formed therein the lower end of which communicates with plenum-like chamber 104 and the upper end of which communicates with the inner chamber 138 of afterburner body 114 as at or near the upper end thereof. In the preferred embodiment, the radially innermost wall segment 140, generally radially inwardly of each conduit 136 is of a thickness substantially less than the effective arcuate length thereof.

In the preferred embodiment, a generally tubular sleeve or liner 142, preferably formed of material which is harder than engine housing section 17, having a cylindrical wall 144 and radiating flange 146, is carried by and internally of housing section 17. A plurality of piston rings 148, 150 and 152 respectively carried in annular grooves 154, 156 and 158 formed in the outer diameter surface 160 of piston 78, are each resiliently urged radially outwardly as to be in sliding contact with the inner cylindrical surface 162 of liner or sleeve 142. As should be apparent, outer cylindrical wall or surface 122 of afterburner body 114, inner cylindrical wall or surface 162 of sleeve 142, the top surface 164 of piston 78 and the annular juxtaposed under surface portion 166 of engine housing section 16 cooperate to define the cylinder combustion chamber 168. As generally depicted in FIG. 1, suitable cavity or passage means 170 may be formed in engine housing head section 16 and, similarly, cavity or passage means 172 may be formed in engine housing section 17 with such being suitably operatively interconnected as by internal or, as shown, external conduit means 174. A suitable coolant liquid may be pumped through such cavities and withdrawn as by a conduit 176 and pump 178 to be subsequently cooled as to atmosphere through suitable heat exchanger means 180 and returned to the coolant cavities as by conduit means 182 leading as to cavity 170.

Referring in particular to FIGS. 1 and 4, a plurality of passages 184 are formed, as in or by sleeve 142, as to have each of such provided with a lower disposed open end 186 and an upper disposed open port 188 in, at times, communication with combustion chamber 168. Preferably, such passages 184 are generally equally circumferentially spaced from each other. As should be apparent, communication through the plurality of conduit or passage means 184 is initiated at the moment that piston means 78, in its downward movement, starts to uncover the respective ports 188. At such time, as will become more apparent, the air supply or air-fuel mixture somewhat precompressed in the chamber or space 190, existing generally below the piston means 78, is permitted to flow through passage means 184 and, through ports 188, into combustion chamber 168.

Engine header housing section 16, as generally depicted, fixedly supports guide or baffle walls 116 and 118 as by a plurality of fasteners cooperating with a flange portion 192. Further, housing section 16 serves to operatively engage and support the upper end of afterburner body 114 in a manner as to assure a sealing connection therebetween.

Typically (since a plurality of such may be employed) plug or nozzle means is illustrated at 194 as being carried by housing section 16 in a manner as to be in communication with combustion chamber 168. Member or means 194 is referred to as a "plug" or "nozzle" means in that such may be ignition spark plugs or igniters in an engine 10 where such are required to initiate combustion of the combustible mixture within the combustion chamber, or they may be fuel injection nozzles if the engine 10 is intended to operate, for example, on diesel fuel. If such elements are in fact spark plugs, their operation is, of course, timed with respect to the movement of the piston means 78 as by any suitable means (not shown), many of which are well known in the art.

Figure 5:
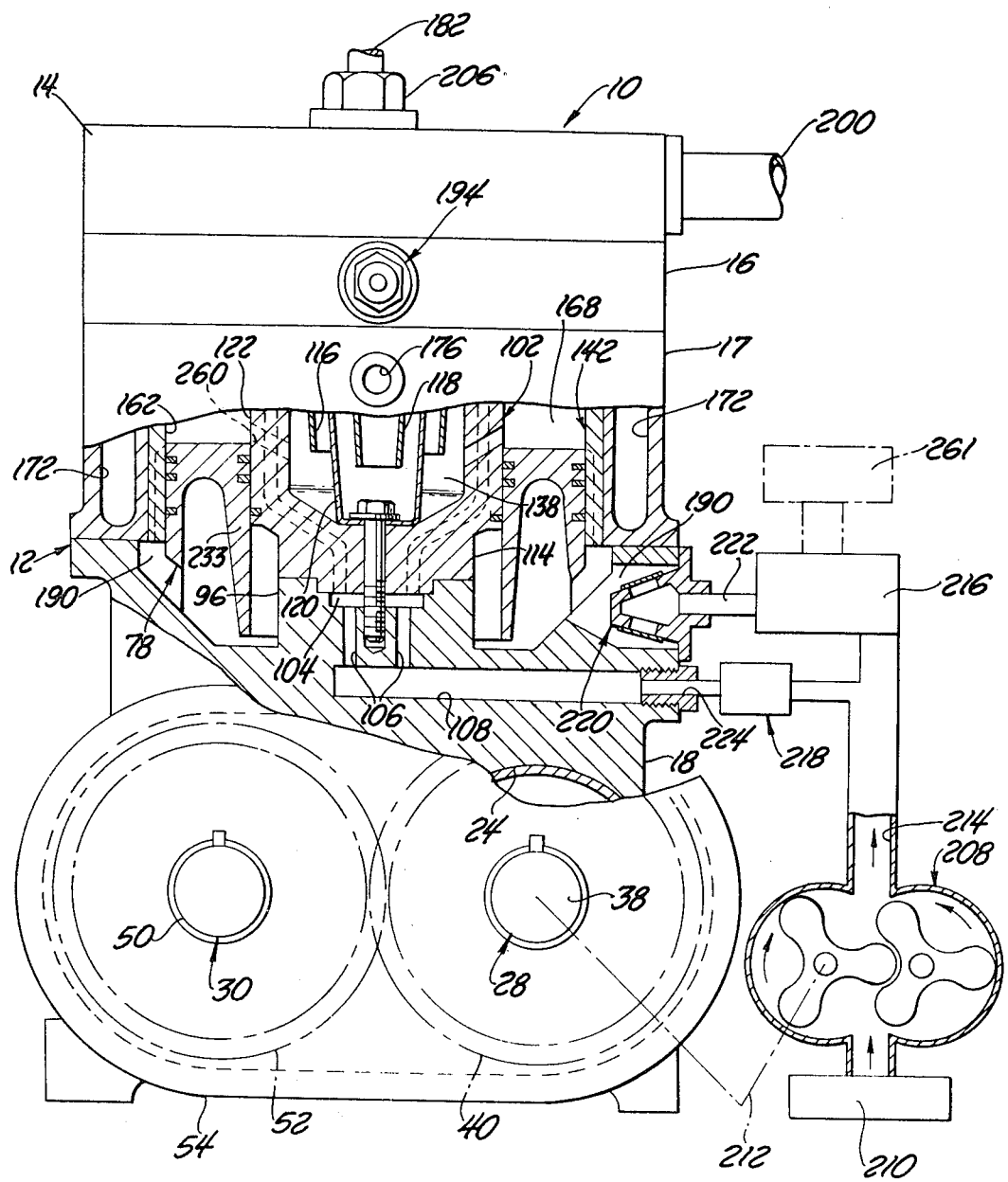
FIG. 5 is a side elevational view of the engine of FIG. 1, taken generally on the plane of line 5—5 of FIG. 1 and looking in the direction of the arrows, with additional elements associated therewith.

Upper engine housing section 14, sealingly secured atop engine housing section 16, serves to provide a plenum-like chamber 196 which communicates with recess 198 formed in housing section 16 and the interior of baffle or wall member 118. An exhaust conduit or passage 200, as generally depicted in FIG. 5, also communicates with plenum 196. As generally depicted in FIG. 1, an upward extension 202 housing section 16 may pass through and be sealingly connected to the outer or upper wall portion 204 of housing section 14 as to be connected as through suitable securing means 206 to conduit 182.

In situations or embodiments of engine 10, where it is desired that such be operated on a diesel cycle, it is preferred that certain additional engine accessory type means be provided. For example, referring in particular to FIG. 5, blower or compressor means 208 is shown having its intake in communication with a source of ambient air as through related suitable air cleaner or filter means 210. Such air compressor means 208 may be operatively driven as through related drive train or motion transmitting means 212 connected as to output shaft 38 of engine assembly 10. The compressed air output of blower means 208 is directed to conduit means 214 which simultaneously supplies suitable related metering valve means 216 and a second related metering valve means 218. Suitable back-pressure or check valve means such as, for example, a reed type valve assembly 220, communicating with chamber 190 of engine housing 12, is supplied with air from metering valving means 216 via conduit means 222. The air supplied to and through valving means 218 is directed as through suitable conduit means 224 to passage 108 from where it flows through passages 106 and 136 and into chamber 138 of afterburner means 102. Generally and each time as piston means 78 moves upwardly toward its top-dead-center (TDC) position, air is supplied through check valve means 220 as to completely fill the void space or chamber 190 within the engine housing 12 generally below such piston 78 with such chamber 190, of course, including any space within the engine crankcase portion. The air supplied to and through passage 108 flows through passages 136 and into chamber 138 where it commingles with combustion chamber 168 exhaust gases as will be described.

FIGS. 8, 9, 10 and 11 illustrate the piston means 78 in greater detail. Referring to FIGS. 8, 9, 10 and 11, the piston 78 is illustrated as comprising a piston body 226 having an upper wall portion 228 integrally formed with a first downwardly depending cylindrical outer wall portion 230 and a second downwardly depending cylindrical inner wall portion 232 with cylindrical outer and inner surfaces 160 and 124 respectively formed thereon.

In order to enhance piston load distribution and assure the best possible parallel reciprocating motion, four wrist pin bearing or journal portions 234, 236, 238 and 240 are provided. Such wrist pin bearing portions, are best seen in FIGS. 8 and 11, are of such size and configuration as not to extend into the imaginary boundary defined by the extension of the inner cylindrical surface 124 of piston means 78.

In the preferred embodiment, both the inner cylindrical wall 232 and the outer cylindrical wall 230 are integrally joined with a plurality of downwardly extending ribs or legs 242, 244, 246 and 248 which, at their respective lower ends generally flare outwardly into foot-like portions 250, 252, 254 and 256 which, in turn, are preferably integrally joined with bearing portions 234, 236, 238 and 240.

OPERATION OF INVENTION

For purposes of description, let it be assumed that the engine 10 is running and, at this first moment of consideration, that piston means 78 is at its BDC position as depicted in FIG. 1 and that combustion chamber 168 is filled with a combustible mixture or motive fluid. From this point, because of the rotation of crankshafts 28 and 30, all four connecting rods 58, 60, 62 and 64 start to experience a lifting motion which, in turn, is transmitted to the piston means 78 causing it to start to move upwardly toward its TDC position.

As the piston 78 thusly starts its upward movement, it closes off ports 188 of inlet passage means 184 and closes off the exhaust passage means which, as illustrated as in FIGS. 1 and 4, comprise a plurality of generally radially inwardly directed exhaust passages or conduits 260 formed through the cylindrical wall of afterburner main body 114. Preferably, such exhaust passages or ports 260 are so positioned as to have the communication therethrough completely opened when the piston 78 reaches its BDC position as depicted in FIG. 1. As should be apparent, with intake ports 188 and exhaust ports 260 becoming closed, further upward movement of piston 78 (causing a reduction in the volume of the combustion chamber 168) results in the combustible mixture contained in the combustion chamber 168 becoming highly compressed. Simultaneously with the compression of such mixture in chamber 168, the underside or lower end of piston 78 is, by moving upwardly, enlarging the volumetric displacement of lower chamber 190 which results in a somewhat reduction in the gas pressure in chamber 190, in turn, causing the additional flow of a fuel air mixture to occur through conduit 222 and check valve means 220 into chamber 190. The air, of course, may be supplied from any suitable source of ambient and may be provided or pumped, if such be desired, as by means 208.

In such a contemplated arrangement, the fuel may be supplied to the air as by suitable carburetor means or the like as generally depicted at 261 and communicating with the air being supplied as through conduit means 214 and 222. If compressor means such as at 208 are employed, then it becomes apparent that, because of the combination of a reduction in pressure in chamber 190 which piston 78 is attempting to create by its upward movement and the superatmospheric pressure of the fuel-air mixture being delivered via conduit means 222 by action of the compressor means 208, an increased quantity and slightly supercharged fuel-air mixture will be supplied to chamber means 190. Such action, of course, continues until piston 78 reaches its TDC position thereby assuring that the maximum volume of chamber means 190 will be supercharged with a fuel-air mixture.

Once the piston 78 attains its TDC position and starts its downward motion toward its BDC position, the volume of lower charge chamber 190 starts to be decreased and the charge therein starts to undergo compression thereby increasing the pressure of the fuel-air charge mixture in charge chamber 190. Such increasing pressure, in turn, shuts the check valve means 220 thereby preventing flow of the fuel-air mixture out of chamber 190 and into conduit 222. Obviously, as the piston 78 moves further downwardly the degree of compression of the fuel-air mixture, as well as the pressure thereof, in charge chamber 190, increases.

What has caused piston 78 to move downwardly is, of course, the ignition of the fuel-air mixture in the combustion chamber 168 and such ignition may have been caused, if such is employed, spark plug 194 being discharged or fired in timed relationship to piston movement and position. As is well known, the ignition and burning in the combustion chamber 168 results in high pressure gases expanding and consequently pushing piston 78 downwardly toward its BDC position. When the piston 78 very nearly approaches its BDC position, top surface 164 of piston 78 opens exhaust passage means 260 thereby enabling the hot exhaust gases, which by that time have lost most of its pressure but not its heat, to rush out of combustion chamber 168 through exhaust passage means 260 and into chamber 138 of afterburner means 102 at points generally radially outwardly of baffles or guide members 116, 118 and 120. The entry of such exhaust gases into afterburner means chamber 138 is at a great velocity and accompanied by a great turbulence therein. As will become even more apparent, such high velocity turbulent exhaust gas flow into and in afterburner chamber means 138 results in a thorough mixing of such exhaust gas or gases with the fresh non-combusted air supplied to chamber means 138 via conduit means 108, 106 and 136.

At or about the same time as piston 78 thusly uncovers exhaust port or passage means 260, it also uncovers inlet ports 188 thereby permitting communication to be completed, through inlet passage means 184, as between combustion chamber 168 and charge chamber 190 at the moment when the fuel-air charge within chamber 190 is compressed the most and at its highest pressure. In the preferred embodiment, inlet ports 188 are so located as to result in ports 188 being totally opened or uncovered, in time, slightly after exhaust passage means 200 are totally opened. Accordingly, it should be apparent that as exhaust ports 260 are opened the exhaust gases start to rush from combustion chamber 168 and into afterburner chamber 138 and as inlet ports 188 are opened the compressed or pressurized fuel-air charge in the charge or precompression chamber 190 flows, at a relatively high velocity, through inlet passage means 184 into combustion chamber 168. Such fuel-air mixture flow being delivered in a direction generally radially inwardly and generally toward surface 122 of the inner cylinder wall (carried by the afterburner body 114) experiences a generally upward deflection thereby creating a looping-like flow pattern within the combustion chamber. This loop-like flow pattern, generally from the cylinder wall 122 upwardly against combustion chamber header surface 166 then downwardly against and deflected off cylinder wall 162, performs a scavenging function whereby exhaust gases are scavenged from the combustion chamber 168 and blown through exhaust passage means 260 into afterburner chamber 138. Simultaneously, of course, the combustion chamber 168 is filled with such new charge of combustible fuel-air mixture. As the piston 78 again starts its upward movement from its BDC position, the described process is again repeated.

By way of further description, with reference to the fresh air and its interaction in afterburner means 102, it has already been stated that such air is supplied as by passage means 108, through conduit or passage means 106 and 136 from where it is discharged into afterburner means chamber 138 preferably near the upper end thereof as viewed in FIG. 1. Also, as previously described, such supply of air is continually assured as by the pumping means 208 (even though it is possible to provide other air supplying or delivery means). As should be apparent, such air flowing through passage or conduit means 136 to a degree serves as a coolant for the afterburner body means 114 and in so doing absorbs some degree of heat thereby rising in temperature as it flows through conduit means 136 so that upon its discharge from conduit means 136 and into afterburner chamber means 138 it (the air) is at its highest temperature. Consequently, as such fresh uncombusted air enters afterburner chamber 138 the temperature of such air is sufficiently elevated as to preclude undue quenching of the exhaust gases entering afterburner chamber 138 from the combustion chamber 168. Therefore, such commingled uncombusted fresh air and exhaust gases remains at a temperature sufficiently high to maintain a continuing combustion thereof which, in turn, results in the complete oxidation of the total exhaust gas ultimately exhausted by the engine as through exhaust conduit means 200.

As should now be apparent, as such further combustion occurs in afterburner chamber means 138 there is an attendant increase in the volume of the resulting oxidized gas. The thermal and kinetic energy of such oxidized gas may, if desired, be, in turn, extracted to perform additional work output as by related means not specifically disclosed in connection with the embodiment of FIGS. 1-5. In any event, as such commingled gas continues to undergo burning in afterburner chamber means 138 it is constrained and directed to flow through the lower open end of baffle or shield 116 and upwardly between such baffle or guides 116 and 120 and then flow downwardly as between the coacting baffles or guides 120 and 118 and finally through the lower open end of member 118 and upwardly therethrough into chamber 196 and out to ambient as through exhaust conduit means 200 which is in communication with chamber 196. Such a generally convoluted flow path provides, in effect, for the prolongation of the available time for burning of the commingled gases, before their exit to ambient, while still providing for a physically compact design or structure.

The operation of the invention has been described with reference to the possibility of employing an associated carburetor 261 or the like for metering fuel to the air being supplied to the precompression chamber 190. Obviously, if the invention is to be practical in its form where such a carburetor or the like is not employed for supplying fuel to the air being supplied into chamber 190, such air may be devoid of any fuel mixed therewith and the fuel may be supplied as through, for example, injector nozzles situated in a manner as depicted, for example, at 194. Such nozzle means may be employed for the delivery of, for example, gasoline or diesel fuel and, if diesel fuel is employed, the compression within combustion chamber 168 would, of course, be sufficient to cause ignition without the need of associated spark plug igniter means. In all other respects, the operation of the engine and gas and air flows and the thermal reactions in the afterburner means would remain as described.

Still considering the embodiment of FIGS. 1-5, in the preferred embodiment thereof, the pair of bearing or journal members 24 and 26 are of a relatively large internal diameter with such diameter being of a dimension sufficient to accept therewithin the lower ends of the connecting rods 58, 60 (within bearing 24) and 62, 64 (within bearing 26). Such is best depicted as in FIGS. 1 and 3 wherein the crankshafts 28 and 30, as well as the connecting rods, are illustrated in a position corresponding to the BDC position of piston 78 and wherein some light clearance still exists as between the crank ends of the connecting rods and the internal diameter of the coacting generally confining bearings 24 and 26.

Preferably, each of the connecting rods 58, 60, 62 and 64 are of unitized or single-piece construction instead of what is conventionally done, that is, providing a split crank-end bearing. In contrast, in the preferred embodiment, the crank ends of each of the connecting rods is formed as with a plain through bore for the reception therein and therethrough of the throw or crank portion of the crankshaft along with, for example, sleeve bearings as depicted, if desired.

Figure 2:
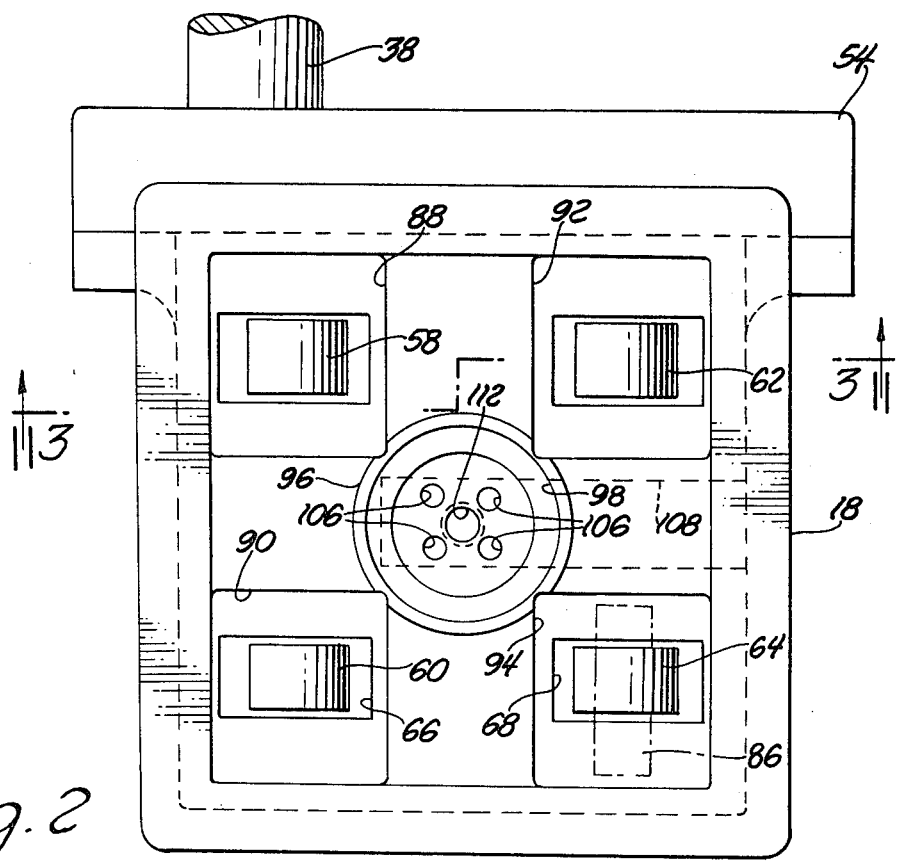
FIG. 2 is, generally, a top plan view of the crank housing of the engine of FIG. 1.
Figure 3:
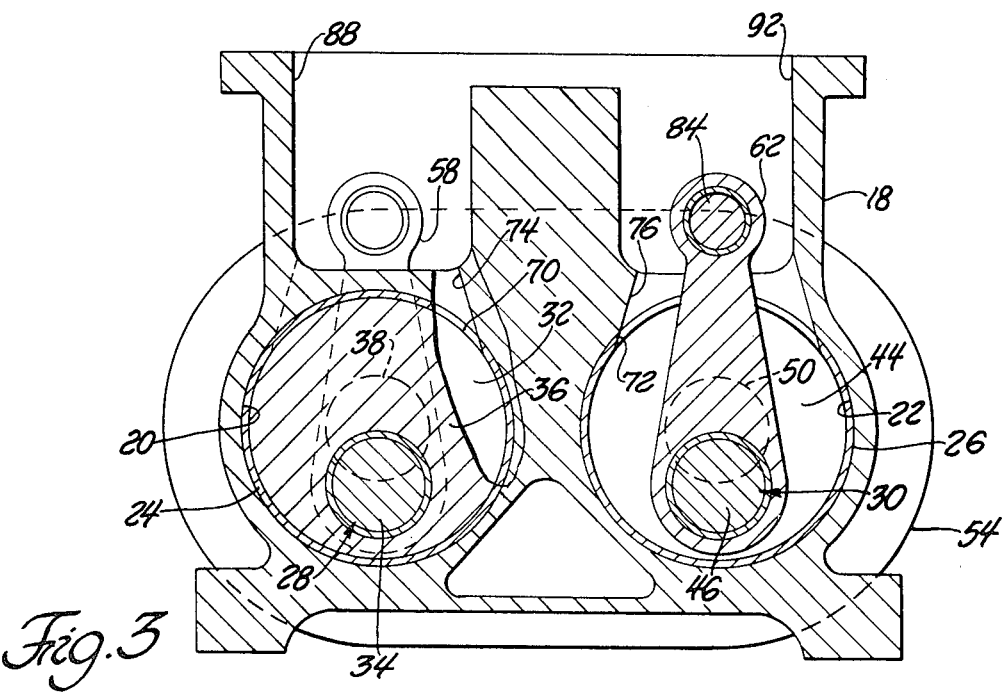
FIG. 3 is a view taken generally on the plane of line 3—3 of FIG. 2 and looking in the direction of the arrows.

As generally depicted in FIGS. 1, 2 and 3, and with reference to FIG. 8, the four connecting rods 58, 60, 62 and 64 are connected to ring or annular piston 78 by wrist pins 80, 82, 84 and 86, respectively. As should now be apparent, the four connecting rods as well as all other load carrying components are sharing the total stress developed by the force of the working piston 78. That is, the total working area of piston upper surface 164 may be considered as being effectively divided into four arcuate segments and, therefore, the total maximum working load or force is not concentrated on a single connecting rod as in conventional prior art engines but rather distributed equally among the four connecting rods 58, 60, 62 and 64. Accordingly, for the same total load conditions and in comparison to the conventional prior art engines, each of the connecting rods 58, 60, 62 and 64 may be constructed to be smaller and of lesser strength than the equivalent single connecting rod of the prior art.

As a consequence of being able to make such connecting rods 58, 60, 62 and 64 smaller (and yet provide the total necessary strength) it then becomes possible to have the crank ends of such connecting rods effectively confined within the bearings 24 and 26 of the crankshafts 28 and 30. In turn, and further, advantages are gained by being able to employ enlarged bearings as 24 and 26. First, in manufacturing the engine, it becomes possible to employ a single-piece tubular member of bearing material and simply press-fit it into place (into a location as depicted, for example, by 24 of FIG. 1). Just being able to do this drastically reduces, as compared to conventional prior art engines, the attendant machining and assembly time. Further, the use of a relatively large tubular bearing, such as at 24 or 26, in turn enables the use of the crank live bearing members 36 which are respectively rotatably journalled within bearings 24 and 26 and respectively journalled to the throws 34 and 36 of crankshafts 28 and 30 as typically illustrated in FIG. 1 by crankshaft 28 and live bearing 36.

More particularly, and in reference to FIG. 1, in assembling the crankshafts, typically, connecting rod 58 would be inserted through clearance slot 70 in bearing 24 and crank throw or eccentric 34 would be inserted through the connecting rod crank journal end. Next, the live bearing 36 would be slid into bearing member 24 and onto throw or eccentric 34 and, finally, connecting rod 60 would be inserted through housing clearance slot 66 and the crank throw or eccentric 34 would be inserted through the crank journal end thereof. As can be seen the entire crank assembly, as in the case of crankshaft 28, is journal supported by a first journal portion 32 and the spaced live bearing 36. The axial length of live bearing 36 may be substantial and it is preferred that such be of maximum length consistent with the available operating space or distance between the two connecting rods (in this case 58 and 60) carried by the throw or eccentric to which the live bearing is journalled. The result, of course, is that the load or stress carrying capacity of the crankshaft assembly is greatly enhanced in that the entire axial length of the cylindrical crank bearing portion 32 and live bearing 36 combine to disperse all the loading forces transmitted thereto by connecting rods 58 and 60. Crankshafts 28 and 30 are operatively connected to each other by respective keyed gear means 40 and 52 thereby assuring unison of operation and maintaining the integrity of vertical movement of the piston 78 while undergoing its reciprocating motion. This, of course, has the further benefit of preventing what often occurs in the conventional prior art engines and referred to as "piston slap". The term "piston slap" refers to the condition where the piston in effect tilts about its wrist pin during its reciprocating motion causing, among other things, the piston skirt to strike the cylinder wall. Such not only creates noise and unnecessary friction but also increases wear in the cylinder wall with all the attendant undesirable consequences.

SECOND EMBODIMENT OF THE INVENTION

Figure 6:
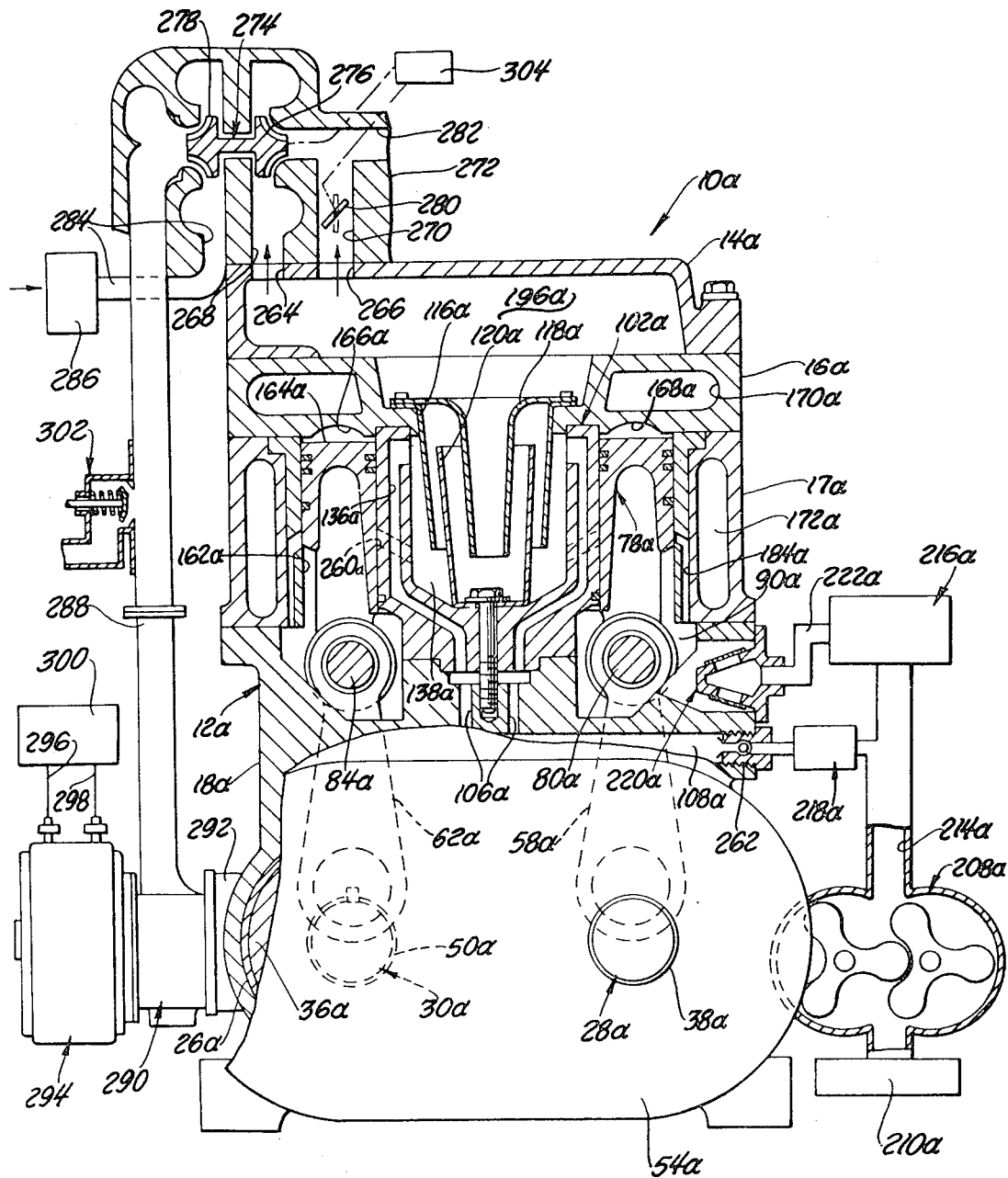
FIG. 6 is a view similar to FIG. 5 but illustrating additional elements associated therewith.

FIG. 6 illustrates a second embodiment of the invention which, in many respects is either identical or similar to the embodiment as disclosed in FIGS. 1-5 and 9-11.

In FIG. 6 all elements which are like or similar to those of any of FIGS. 1-5 and 9-11 are identified with like reference numerals provided with a suffix "a" the operation and function of which correspond to those like or similar elements of FIGS. 1-5 and 9-11. Certain of the details and/or elements shown in FIGS. 1-5 and 9-11 are omitted for purposes of clarity. In addition to other elements to be described, the pressure regulator means 218a may be provided with check valve means 262 downstream thereof.

In comparison to the embodiment of FIGS. 1-5, upper housing section 14a is somewhat modified in order to provide two exhaust ports or passages 264 and 266 which respectively communicate with conduit means 268 and 270 in associated connected housing means 272. Rotatably carried internally of such housing means 272 is a turbine driven compressor assembly 274 comprised of a turbine section 276 and a compressor section 278 operatively interconnected. Exhaust passage means 264 and 268 may be considered the main or primary exhaust port or conduit means and as such feeds or supplies the engine exhaust gases to the turbine means 276 thereby providing the energy for driving turbine 276 and compressor 278. Secondary exhaust port or passage means 266 and 270 is preferably provided with variably openable throttling or valving means 280 effectively operable to permit any exhaust gases in excess of that necessary to adequately drive turbine 276 to be vented, directly from chamber 196a, to ambient as through exhaust outlet conduit means 282. The same conduit means 282 is depicted as also being effective to exhaust such gases as were supplied via conduit means 268 and spent in and discharged by turbine 276.

Housing means 272 is also provided with compressor inlet conduit means 284 which, preferably, communicates with a source of ambient air as through associated air filter means 286. Compressor discharge conduit means 288 is depicted as communicating with associated suitable vane type or other form of air motor means 290 which may be suitably supported as on boss-like mounting means 292, carried by or formed on the engine housing means 12a. Illustrated as being operatively connected to and driven by air motor means 290 is an associated accessory which, in fact, may be an engine accessory 294 or an accessory for servicing some non-engine function of the vehicle associated with the engine. The specific accessory 294 depicted in FIG. 6 comprises electrical generating means often referred to as a "generator" or "alternator" and as such may be provided with output terminals 296 and 298 operatively interconnected as to related electrically energizable means 300. Preferably, the output of compressor 278 is at least somewhat regulated to a maximum value and such may be accomplished, for example, as by pressure relief valving means 302 effective for opening or venting conduit means 288 to ambient whenever the output pressure of compressor means 278 exceeds a preselected maximum pressure. Such dump or bleed valve means providing the function of valving means 302 may, of course, be incorporated directly into the compressor portion of the turbine compressor assembly 274.

As is already apparent and as clearly previously discussed, the basic engine of the invention produces, in comparison to conventional prior art engines, a considerably larger volume flow of exhaust gases with such gases containing significantly greater heat energy. Accordingly, the turbine compressor assembly 274 and structure related thereto and associated therewith provides a means for recovering, to a great extent, the energy, both velocity and heat, from such exhaust gases. That is, the engine developed and afterburner treated exhaust gas is directed to and against turbine 276, via conduit means 264, 268, thereby driving compressor 278 with the result that ambient air, supplied through intake conduit means 284, is pressurized and delivered through outlet conduit means 288 to the air motor means 290 which, in turn, drives the electrical generator or alternator means 294 to provide electrical energy to associated consuming means 300. Therefore, in addition to the efficiency and clean burning of gases provided by the basic engine of the invention, the invention also contemplates means, such as that depicted in, for example, FIG. 6, whereby even further fuel efficiencies can be realized by extracting the energy contained within the afterburner treated exhaust gases.

Other benefits, which may not immediately be apparent, are obtained as a consequence of employing engine exhaust gases to drive turbine means in the manner disclosed in FIG. 6. For example, the extraction or recovery of exhaust gas velocity and heat energy is accomplished without the use of any gearing (whether reduction or transmission) means which often causes problems in those situations where the related engine is required to operate under conditions experiencing a wide spectrum of speeds as in, for example, automotive applications. In contrast, with the exhaust gas driven turbine compressor system of FIG. 6, the problems of effectively utilizing a substantial quantity of the total exhaust energy are minimized if not effectively eliminated. For example, with the invention, if the engine 10a is running at a slow speed, the turbine 276 will also be running at a relatively slow speed and if the engine gains speed the turbine 276 also increases its speed and provides more work output. Accordingly, if the alternator 294 should produce a relatively low output at idle engine operation, its output will steady increase to, for example, possibly several horsepower as soon as the engine 10a sufficiently increases its speed. If, for example, the speed of engine 10a should increase to some magnitude whereby, as a consequence thereof, turbine compressor assembly 274 would overspeed, the throttling or bypass valving means 280 would be appropriately opened in order to cause some of the exhaust gas to bypass the turbine 276. Such valving means 280 may, for example, be controlled by means 304 responsive to turbine means 276 attaining a preselected magnitude of speed at which time such means 304 would be effective to cause opening of bypass valving means 280.

THIRD EMBODIMENT OF THE INVENTION

Figure 7:
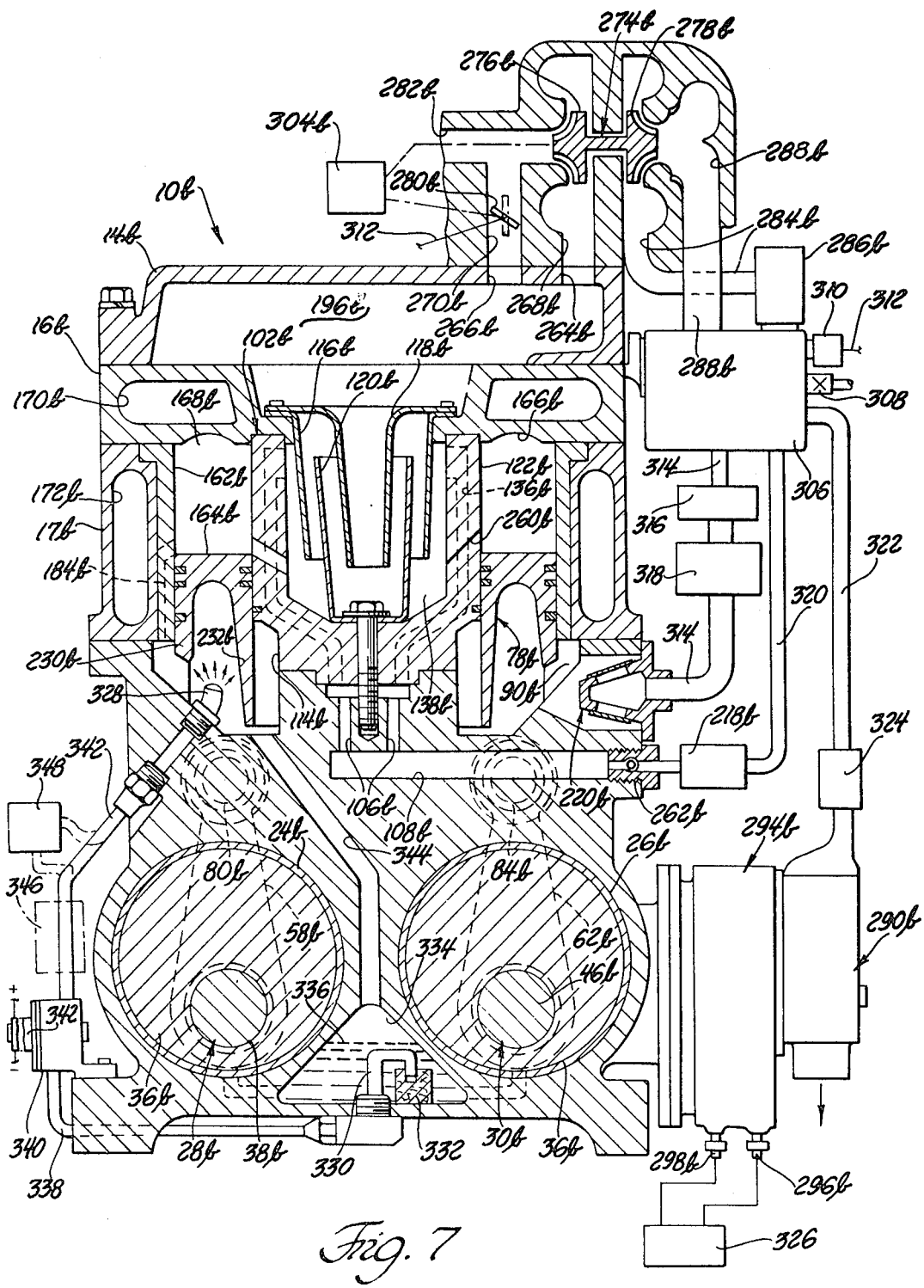
FIG. 7 is a cross-sectional view, taken generally on the plane of line 7—7 of FIG. 1 and looking in the direction of the arrows, showing additional elements in association with the engine.

FIG. 7 illustrates another embodiment of the invention which in many respects is illustrated as either identical or similar to the embodiments of FIGS. 1-6 and 9-11.

In FIG. 7 all elements which are like or similar to those of FIGS. 1-6 and/or FIGS. 9-11 are identified with like reference numerals provided with a suffix "b" the operation and/or function of which correspond to those of like or similar elements of FIGS. 1-6 and 9-11. Only so many of such elements and/or details of the previous embodiments are illustrated as are considered necessary to fully understand the operation of the embodiment of FIG. 7.

Generally, in comparing the embodiment of FIG. 7 to that of FIGS. 1-6, it can be seen that the turbine compressor assembly 274b is intended to provide the functions of both the pump means 208 of FIG. 5 and the turbine compressor assembly 274 of FIG. 6. In the preferred embodiment of the invention depicted in FIG. 7, the compressor output conduit means 288b leads to and delivers the output of compressor 278b to an accumulator means 306 which, preferably, is provided with suitable valving or venting means, such as at 308, for bleeding-off excess pressure within accumulator 306. Such means 308 may be pressure responsive. Further, suitable pressure responsive means may also be provided as at 310 which upon sensing a preselected maximum pressure within accumulator 306, and possibly also sensing the occurrence of pressure venting, is effective, as via means 312, to cause opening of bypass valving means 280b to thereby reduce the work load on the turbine compressor assembly 274b.

Conduit means 314 operatively interconnecting the reed or check valve means 220b to accumulator 306 serially contains pressure regulator means 316. If the engine is to be employed in combination with a carburetor or the like fuel metering structure, such may be provided, in a manner generally comprising a portion of the overall conduit means 314, downstream of pressure regulator means 316 as at 318.

Second conduit means 320 is illustrated as communicating between accumulator 306 and, through metering valving means 218b, air conduit or passage means 108b. Further, third conduit means 322 communicates as between accumulator 306 and air motor means 290b. Such conduit means 322 may be provided with valving means 324 effective for opening only upon the existance of a sufficiently high pressure of air in the accumulator for assuring the continued operation of the engine as required, for example, by valving or regulating means 316 and 218b. As should be apparent, once the engine is running, air compressor means 278b will, most of the time, supply an over-abundance of compressed air and at a pressure higher than valves or regulating means 316 and 218b will require during the full range of engine operation. Accordingly, such over-abundance of compressed air can then be delivered via conduit 322 and open valve 324 to the air motor 290b which may be directly coupled to electrical generating means 294b thereby converting the surplus energy of the compressed air into electrical energy which can be stored, if need be, as in battery means 326 which, in turn, may be employed for electrically driving engine cooling pump means, cooling fans, fuel pumps, power steering pumps, air conditioning compressors and/or other devices.

Still referring to FIG. 7, the invention also contemplates the provision of what might be considered as being a secondary type of cooling system. That is, somewhat by way of background, the annular or ring piston of the invention, such as at, for example, 78b, is subjected to a heat distribution basically different than that to which conventional prior art pistons are subjected. As should be apparent, with the annular or ring piston of the invention, the radially outer surface of the piston is effectively in contact with the outer cylindrical wall of the combustion chamber which outer cylindrical wall is being effectively cooled as by the water cooling means comprising passage means as at 172b. In contrast, the radially inner surface of the piston is effectively in contact with the inner cylindrical wall of the combustion chamber as defined, for example, by cylindrical surface 122b of afterburner housing 114b. As should be apparent, the afterburner means 102b and housing 114b will most probably be considerably hotter than the cylinder outer wall surface 162b during engine operation. However, cooling, as by water, of the afterburner means is undesirable since it is preferred that heat loss from the afterburner means be kept to an absolute minimum. The partial cooling which is provided as a consequence of the fresh air flow as through passage means 136b is not in effect a loss or removal of heat energy from the afterburner means in that such heat energy is transferred to the air which still continues into the afterburner chamber 138b. Consequently, where the temperature gradient or difference as between the radially inner and radially outer surface of the ring piston may be great, undesirable stresses in the ring piston may occur.

In order to overcome such possible thermal stress problems, it is contemplated that a secondary type of cooling system be employed. Such, by way of example, is illustrated in FIG. 7 as preferably comprising a plurality of nozzle means, one of which is shown at 328, situated in the engine housing as to be generally in the area below the ring piston. Preferably, such nozzle means, as 328, are situated as to be generally in the area between the inner piston wall 232b and outer piston wall 230b.

An inlet conduit 330, having its inlet end as within a filter 332 situated in the engine oil reservoir 334, delivers oil 336 to conduit means 338 leading to preferably high pressure pump means 340 which may be driven as by associated electric motor means 342 or any other suitable drive means. The pump 340 then pumps such oil under high pressure, via conduit means 342, through the (preferably plurality of) nozzle means 328 which, in the preferred form, is of the type having a plurality of spray orifices which can be selectively aimed at preselected areas of the ring piston and cylinder walls as such cylinder walls are uncovered by the ring piston. Further, a plurality of oil return or drain passages, one of which is shown at 344, are provided in and through selected portions of the engine housing as to enable the cooling oil thusly sprayed from nozzle means 328 to, after running off the sprayed surfaces, return or drain to reservoir 334. The oil pump 340 may be of a capacity sufficient to also provide pressurized oil flow for the lubrication of other engine components as, for example, crankcase journals, shaft bearings and/or connecting rod bearings. As also depicted in FIG. 7, it is preferred that oil outlet conduit means 342 actually be in circuit with related filter means 346 and oil cooler means 348 as, for example, a radiator to ambient or the like.

MODIFICATION OF THE INVENTION

FIGS. 12-16 illustrate modifications of the invention as shown in, for example, FIGS. 1-7. More specifically such modifications pertain primarily to crankshaft means and crank housing means. All elements in FIGS. 12-16 which are like or similar to those of FIGS. 1-7 are identified with like reference numerals provided with a suffix "c" and only so many of such prior disclosed elements and/or details are shown as are believed necessary to fully understand the modifications of FIGS. 12-16.

Figure 12:
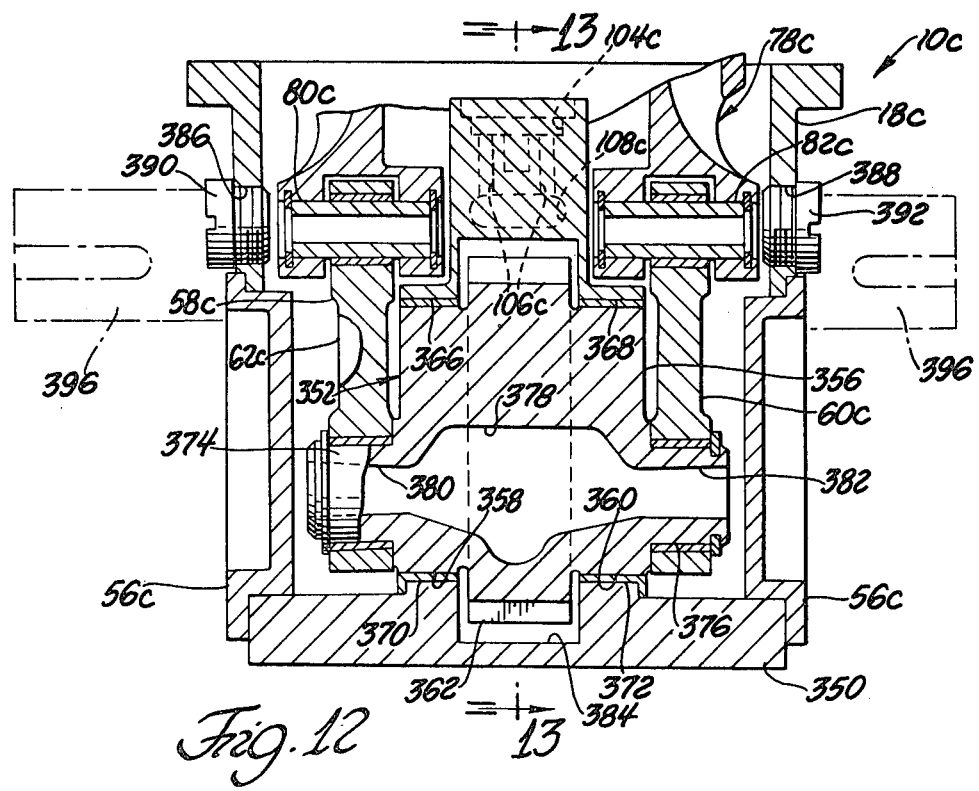
FIG. 12 is a cross-sectional view of a crank housing similar to that as shown in FIG. 1 but with a modified gearing arrangement.
Figure 13:
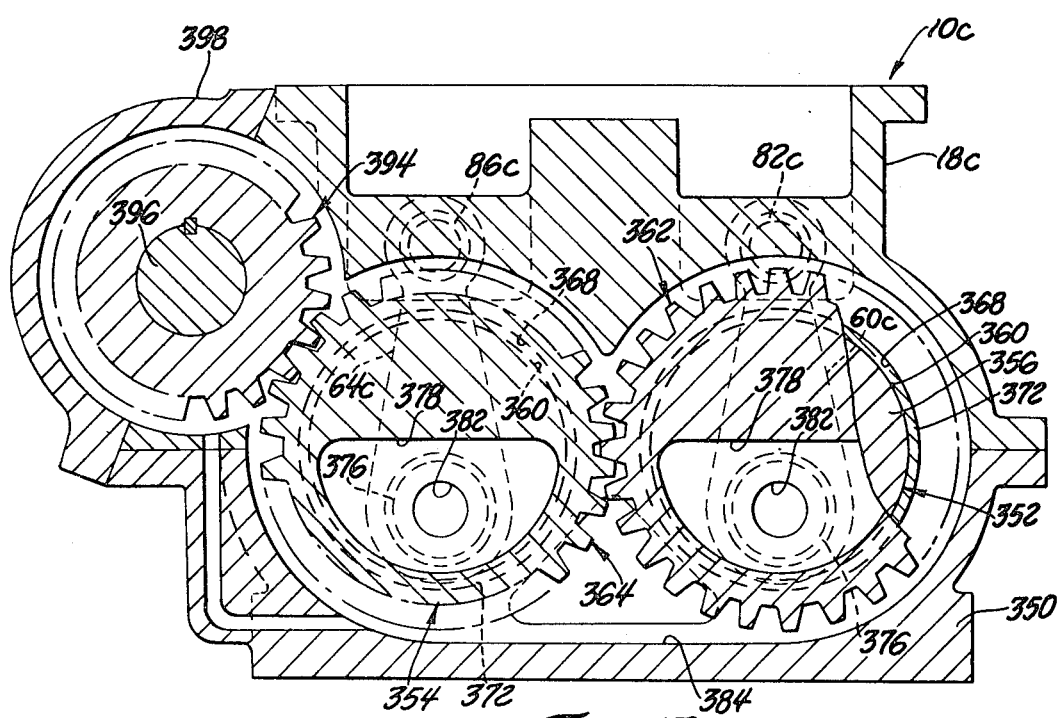
FIG. 13 is a cross-sectional view taken generally on the plane of line 13—13 of FIG. 12 and looking in the direction of the arrows.

Referring now in greater detail to FIGS. 12 and 13, the engine 10c is illustrated as comprising a crank engine housing section 18c with a lower portion 350 thereof being detachably secured to the coacting upper portion. The crankcase or housing 18c contains a pair of parallel crankshafts 352 and 354. As typically illustrated by 352 in FIG. 12, each crankshaft comprises a cylindrical main body 356 having axially spaced cylindrical bearing surfaces 358 and 360 with a concentric gear portion therebetween. (For sake of avoiding possible confusion, the gear portion formed on crankshaft 352 is designated 362 while the similar gear portion formed on crankshaft 354 and shown in FIG. 13 is designated 364.) Housing means 18c and 350 are provided with axially spaced journal portions 366 and 368 which serve to support, as through intermediate annular bearing members 370 and 372, the cylindrical bearing portions 358 and 360 of each crankshaft 352 and 354. At opposite axial ends of body 356 are formed aligned but eccentrically disposed crankshaft throw or eccentric portions 374 and 376. Preferably, each of the crankshafts 352 and 354 is formed of unitary construction as by casting or the like and, still further, the main body of each crankshaft is preferably provided with a cavity portion 378 serving to lighten the overall crankshaft and to remove unbalanced weight internally of the crankshaft. To this end through apertures and/or passages 380 and 382 are provided as through crank portions 374 and 376, respectively, in order to even further facilitate casting of the crankshafts. A suitable clearance portion as at 384 is provided in lower crankcase housing section 350 to accommodate gears 362 and 364.

The crank ends of connecting rods 60c and 64c are respectively journal-connected to crank portions 376—376 of crankshafts 352 and 354 while the crank ends of connecting rods 62c and 58c are respectively journal-connected to crank portions 374—374 of crankshafts 354 and 352. Such crank ends of the connecting rods, again, do not have to be of the split-end type since such can be simply pushed onto the respective cooperating crank portions, where they can be axially retained as by suitable snap rings, prior to assembly of the crankshafts to the crank housing means 18c.

Once both crankshafts 352 and 354 and the four connecting rods are assembled within upper and lower portions of the engine crank housing section 18c, the ring piston 78c, fragmentarily illustrated, can be lowered into the housing section 18c and there connected to the upper ends of connecting rods 58c, 60c, 62c and 64c as by respective wrist pins 80c, 82c, 84c (not shown), 86c.

For convenience of assembly, four access apertures, two of which are depicted at 386 and 388, are provided for enabling the insertion therethrough of the respective wrist pins into cooperating connecting rods and connecting portions of the piston 78c. Such access holes are subsequently sealingly losed as by appropriate closure or capping means as typically shown at 390 and 392. Preferably, wrist pins 80c, 82c, 84c and 86c are of hollow construction thereby reducing the weight thereof and making it easier for disassembly, if such should be subsequently desired, by enabling the insertion therethrough of related tool means to pull the wrist pins outwardly through the access apertures.

Although the gears 362 and 364 may have any desired tooth configuration, in the preferred form of the embodiment of FIGS. 12 and 13, gears 362 and 364 are of the herringbone type thereby eliminating any need of any axial thrust bearings.

Crankshafts 352 and 354 as well as gears 362 and 364 obviously rotate in counter-rotating directions in unison with each generally in the same manner as the crankshafts of the embodiments disclosed in FIGS. 1-7. However, in the embodiment or modification contemplated by FIGS. 12 and 13, the combined input forces exerted by the four connecting rods on the two crankshafts is transmitted to a third gear 394, which is suitably fixed to an output or drive shaft 396 for rotation therewith; the gear 394 which may be larger, smaller or the same effective size as gears 362 and 364 is placed in running meshed engagement as with gear 364 thereby conveying the total power from gears 364 and 362 to the output shaft 396. The gear 394 and shaft 396 may be suitably journalled as within related journal housing means 398.

Figure 14:
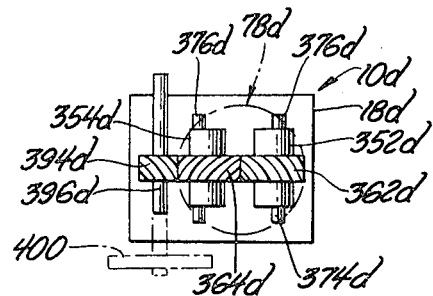
FIG. 14 is a somewhat schematic representation of a single cylinder engine employing the gearing arrangement and output as shown in FIGS. 12 and 13.
Figure 15:
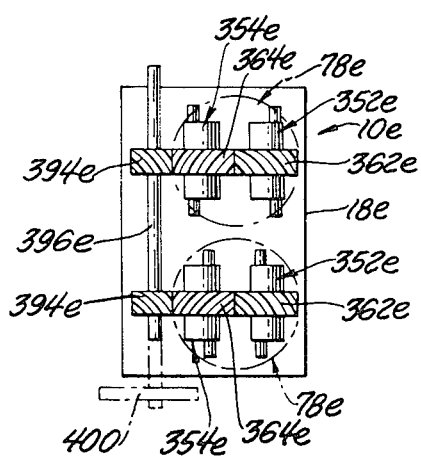
FIG. 15 is a somewhat schematic representation of a two cylinder engine employing the gearing arrangement of FIG. 14.
Figure 16:
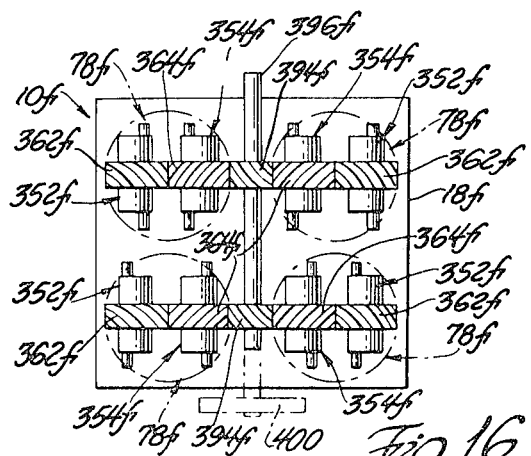
FIG. 16 is a somewhat schematic representation of a four cylinder engine employing the gearing arrangement of FIG. 14.

FIGS. 14, 15 and 16 illustrate, in simplified manner how the invention as exemplified by FIGS. 12 and 13 may be, in effect, combined as to become, instead of a single piston engine to one which is a multi-piston engine. In FIGS. 14, 15 and 16 elements to which reference is made and which are functionally like or similar to those of are identified with like reference numbers provided with, in FIG. 14, a suffix "d"; in FIG. 15, a suffix "e" and in FIG. 16, a suffix "f". As should be readily apparent, FIG. 14 is clearly a simplified illustration of the gearing means, crankshafts and output shaft disclosed in FIGS. 12 and 13; further, if desired, suitable flywheel means as generally depicted at 400 may be provided. As will become even further apparent, when comparing FIGS. 14, 15 and 16, the arrangement of FIG. 14 (based on FIGS. 12 and 13) may be considered as engine module in that it can be employed to construct a modular overall engine using, in effect, multiples of the arrangement of FIG. 14. In viewing FIG. 15, it can be seen that the structure or arrangement represented thereby actually comprises two of the arrangements shown in FIG. 14. The same could be done if a multiple of, for example, three (of the structure of FIG. 14) were desired. In effect, the most that would have to be provided is for the lengthening of output shaft means 396e.

If an engine of four cylinders were to be desired, the arrangement could be that as depicted in FIG. 16. It will be noted that such is in effect twice the multiple or two cylinder engine of FIG. 15 except that it still does not require multiple output shafts but rather only one shaft means 396f with an output gear 394f between oppositely disposed cylinder-crank arrangements.

Still with reference to FIG. 16, when an engine of four cylinders or four cylinder modules is arranged or constructed, it should be clear that if the crankshaft gears 364f in the left side (as viewed in FIG. 16) of the engine are rotating counter-clockwise, then the crankshaft gears 364f in the right side (as viewed in FIG. 16) of the engine are also rotating counter-clockwise. However, it is apparent that the various pistons 78f can be staggered in their respective positions as to obtain a desired ignition timing and sequence.

Accordingly, in view of FIGS. 14, 15 and 16 it should be apparent that the invention provides for and enables the building or construction of engines with any desired number of cooperating piston-cylinder-crank arrangements and that such can be easily and efficiently accomplished.

SELECTED COMMENTS RELATING TO EMBODIMENTS OF FIGS. 1-16

As should be apparent in the embodiments already discussed, each employs a ring or annular type piston which is connected through four connecting rods to two coacting crankshafts. Such ring piston is also formed to provide a relatively elongated inner cylindrical skirt which is slidably fitted to the inner cylindrical wall of the combustion chamber which, in fact, is the outer cylindrical wall of the afterburner means. The inner bore or cylindrical surface of the ring piston is purposely unobstructed, the wrist pin journal portions being radially outwardly thereof, as to thereby make the machining of the piston inner bore or cylindrical surface easier and for enabling ease of assembly and disassembly of the ring piston relative to the engine cylinder walls and the afterburner means.

In each such ring piston, four bearing of journal portions are provided for respective connection to connecting rods by means of respective wrist pins. Such are arranged as to be in pairs wherein the pairs are parallel to each other and wherein, in each pair, the axes of the individual wrist pins are in alignment with each other. Each of the four journal portions is spaced a substantial distance below the main body of the ring piston and preferably integrally formed to, as to form an end thereof, relatively elongated leg-like extensions integrally formed with the radially inner and outer cylindrical walls of the piston. Such leg-like extensions, by virtue of being integrally formed with the said radially inner and outer cylindrical walls, define web-like reinforcing means as between such inner and outer cylindrical walls thereby enhancing the strength of the piston without an undue increase in weight thereof.

The ring piston of the invention has the advantage of being very light in weight and yet structurally very strong. This is at least partly due to the fact that the top of the piston, often referred to as the working areas, can be considered as being, in effect, divided into four working sectors whereby each sector transmits one-fourth of the total force, created against the working area, to respective ones of the wrist pins and associated connecting rods. Accordingly, each of the connecting rods can be made lighter and shorter than connecting rods for conventional prior art engines.

Further, because the ring piston has a relatively large working area, it becomes possible to provide for a shorter piston stroke. With the ring piston of the invention, it is possible to reduce the piston stroke by seventy-five percent (75%) or more as compared to solid non-ring type pistons of the prior art having the same working area and where the cylinder bore equals the piston stroke. It should be apparent that in such a reduced stroke embodiment, the associated connecting rods will even be, comparatively, further reduced in length (size) and weight.

The various embodiments of the invention provide further benefits and advantages. For example, the invention provides for a system of assembling the connecting rods which results in it not being necessary to have the lower or crankshaft ends of the connecting rods to be of the split bearing type. According to the invention, each connecting rod may be of one solid piece and, at most, needs only sleeve type bearing inserts. The advantage of this, obviously, is the resulting simplicity of manufacture and consequent low costs. The same simplicity of manufacture and assembly and resulting low cost also applies to the crankshaft means of the invention. Such crankshaft means may be formed and machined by use of conventional manufacturing tools and machines and are readily produced and assembled by state-of-art technology.

The provision of a dual crankshaft system is interrelated with the provision of two pairs of connecting rods for assuring the integrity of vertical movement of the ring piston. Further, by being able to axially space two axially aligned wrist pins and connecting rods a substantial distance from each other, it becomes possible to provide, within an equivalent axial space of the crankshaft means, an axially elongated large diameter main crankshaft bearing body which, itself, is joined as within a still larger sleeve-like bearing.

Accordingly, as illustrated in, for example, the first embodiment of the invention, the main bearing body (typically at 36) is a simple and uncomplicated cylindrical member which has to have only one through hole, eccentrically situated, prepared to receive a cranking pin or crankshaft throw portion. The cranking pin, however, is part of a disc-like portion (typically at 32) with a diameter preferably the same as the diameter of the main live bearing body thereby enabling both the disc-like body portion and the main live bearing to be journalled in a one-piece and common bearing member (typically at 24).

When the ring piston reaches the position of uncovering the exhaust ports or passages, the burned gases rush out through such exhaust ports and consequently rapidly lose pressure; however, as the exhaust means are being thusly uncovered, the piston, along its opposite wall, is also uncovering the inlet ports or passages and the slightly precompressed fresh air charge generally beneath the piston is permitted to enter into the combustion chamber with a slightly higher pressure than the already partially exhausted exhaust gases.

In the preferred embodiment, the plurality of inlet ports (typically 188 of FIG. 4) are respectively in angularly staggered relationship to the exhaust ports or passages (typically 260 of FIG. 4) and not in radial alignment or juxtaposition to each other. Consequently, the fresh air admitted into the combustion chamber via conduit means or ports 88 is first directed as against the solid inner cylindrical wall of the combustion chamber thereby acting as a coolant with respect to such inner cylindrical wall which, in fact, is the outer wall of the afterburner means. After striking the inner cylindrical wall, such fresh incoming air is deflected upwardly as to generally create a loop-like flow path against the upper wall of the combustion chamber, against the outer cylindrical wall of the combustion chamber and downwardly against and across the top working surface of the piston thereby scavenging and forcing out, through the exhaust means, the previously burned gases.

It is generally accepted that prior art internal combustion engines lose at least 36% to 40% of the fuel energy, delivered to the engine, through the engine exhaust. However, the engine of the invention being further provided with air compressor or pumping means and two different supply ports for adding fresh air and because the combustion chamber thereof is operating under conditions whereby a higher filling percentage is achieved and, further, because the afterburner means gets a constant supply of fresh air for further oxidation, thereby resulting in a further expansion of exhaust gas volume and increase in exhaust gas heat content, significantly improved conditions are achieved enabling the subsequent recovery of such energy from the exhaust gases prior to their discharge to the ambient.

FOURTH EMBODIMENT OF THE INVENTION

FIGS. 17–23 illustrate a fourth embodiment of the invention which, in many respects, is either identical or similar to the invention as disclosed in FIGS. 1–11.

In FIGS. 17–23 elements which are like or similar to those of the preceding Figures are identified with like reference numerals provided with a suffix "g".

Before progressing to a detailed consideration of the embodiment of FIGS. 17–23 it should be pointed out, generally, that such employs a single crankshaft means rather than the pair of parallel crankshafts of the preceding embodiments.

Figure 17:
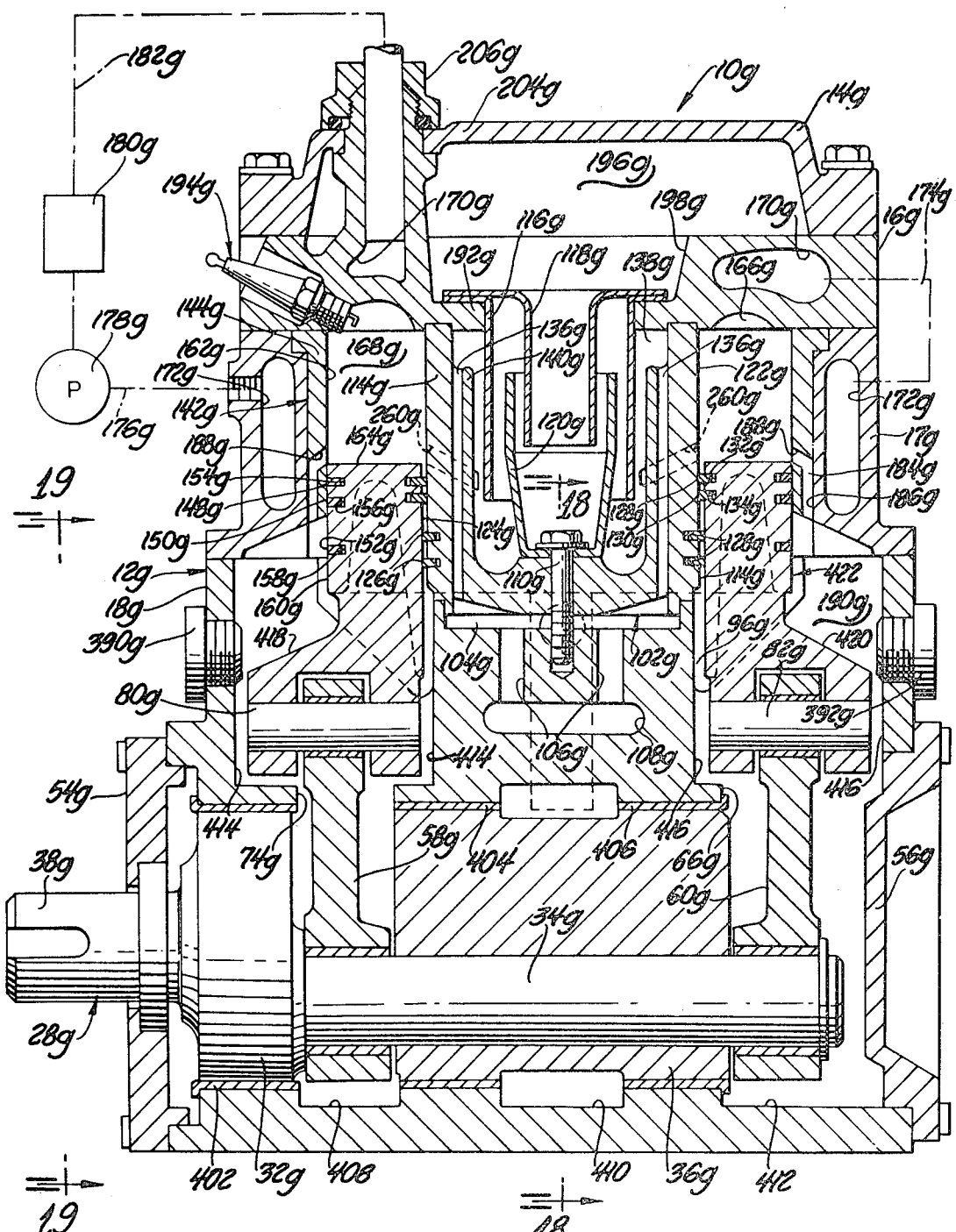
FIG. 17 is an axial cross-sectional view of another embodiment of the engine of the invention.
Figure 20:
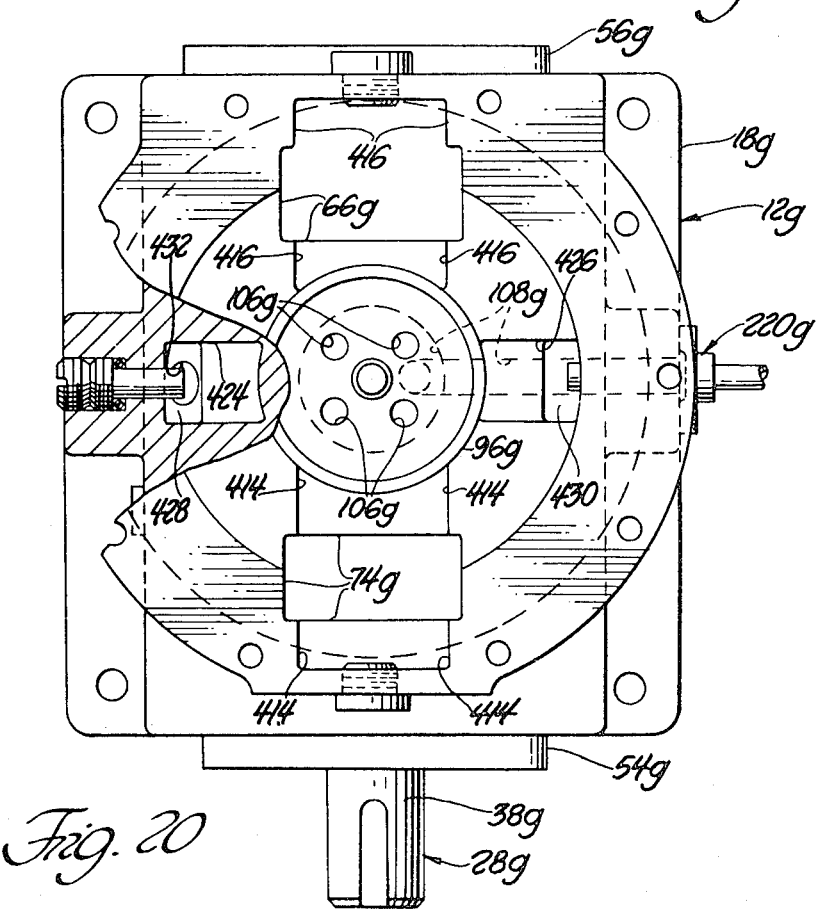
FIG. 20 is a top plan view taken generally on the plane of line 20—20 of FIG. 19 and looking in the direction of the arrows.

Now referring in greater detail to the embodiment of FIGS. 17–23, in the preferred form thereof, separate sleeve-like bearing members 402, 404 and 406, each preferably of identical inner and outer diameters, are received, as by press-fitting thereof, by the crankcase engine housing section 18g and such bearing members serve to journal the disc-like bearing portion 32g of crankshaft means 28g and the live bearing 36g. It should be mentioned that, especially in view of the teachings of FIGS. 12 and 13 and cavity means 378 shown therein, live bearing 36g as well as live bearings 36, 36a and 36b may also be partly hollow in order to improve the dynamic balance thereof. Even though not necessary to the practice of the invention, in the preferred form thereof, relieved openings or clearances 408, 410 and 412 are provided and such may be of generally annular configuration as typically illustrated at 410 of FIG. 18 and wherein clearances 408 and 412 communicate with and generally comprise a portion of the overall charge or pre-induction chamber 190g as by means of respective openings or passages 74g and 66g. As shown in FIGS. 17 and 20, engine crankcase housing 18g is preferably provided with relatively enlarged pockets or chamber portions 414 and 416 as to be of a configuration and size adequate to respectively receive therein bearing portions 418 and 420 of ring or annular piston means 422. Further, housing section 18g is also provided with pocket-like chambers or recesses 424 and 426 which are situated generally diametrically opposite to each other (with reference to the axis of piston means 422), and, preferably, angularly midway between chambers or recesses 414 and 416. Such chambers 424 and 426 may terminate, respectively, as in lower disposed wall portions 428 and 430 with, preferably, wall 428 having aperture or passage means 432 formed therethrough.

Figure 18:
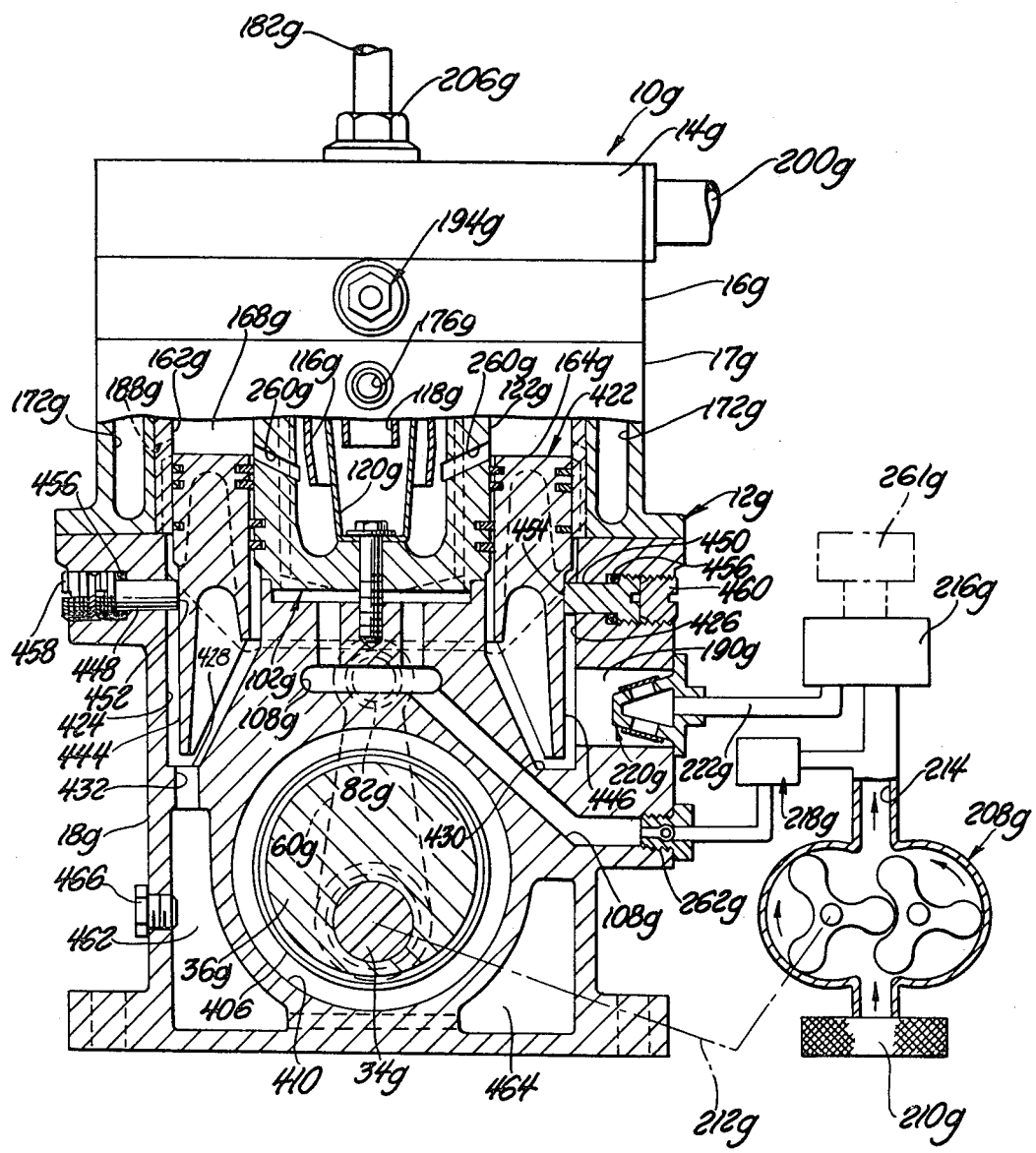
FIG. 18 is a cross-sectional view taken generally on the plane of line 18—18 of FIG. 17 and looking in the direction of the arrows.
Figure 19:
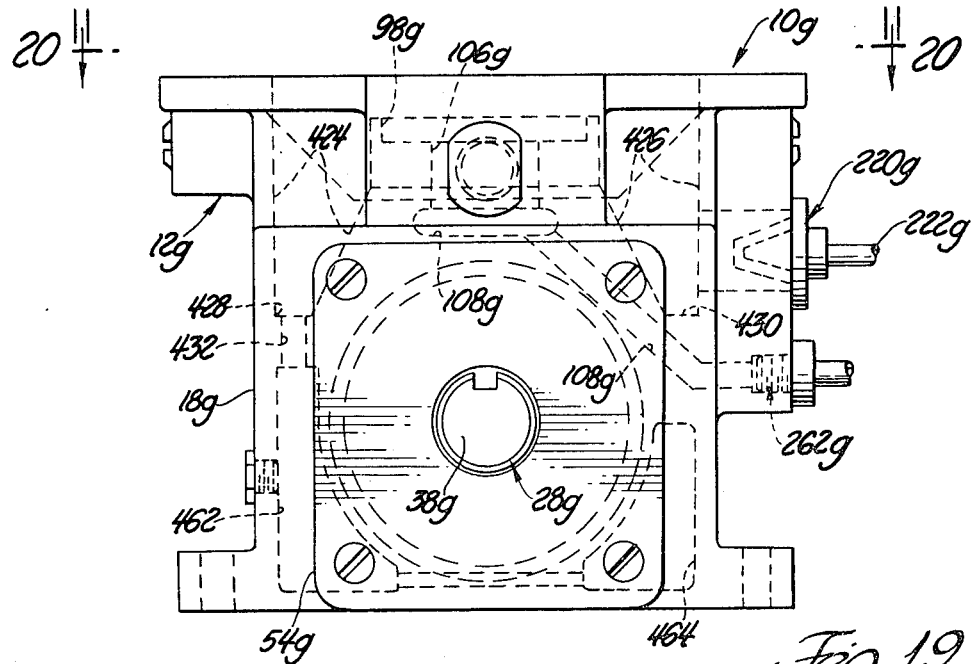
FIG. 19 is a fragmentary side elevational view taken generally on the plane of line 19—19 of FIG. 17, with portions thereof broken away and looking in the direction of the arrows.

Referring in greater detail to FIGS. 21, 22 and 23, wherein FIG. 21 may be considered as a view taken on the plane of the top surface 164g of piston 422 of FIG. 18 and looking downwardly, the piston 422 is depicted to be in substantial portion similar to piston means 78 having inner and outer annular wall portions 232g and 230g integrally formed with an upper annular wall portion 228g respectively defining an inner cylindrical surface 124g, outer cylindrical surface 160g and top working surface 164g. As will be noted, contrary to the arrangement of piston means 78, the present piston 422 has its connecting rod wrist pin journals or bearings 418 and 420 arranged as to have the centerlines of such in alignment and passing through the axis of the piston body 226g. Further, the radially inwardly disposed ends 436 and 438 of bearing portions 418 and 420 are situated as to radially outwardly of the space defined, and confined, as by an extension or continuation of the inner cylindrical surface 124g.

Since piston 422 is to be mounted, through connecting rods 58g and 60g to single crankshaft means 28g, the piston 422 may tend to experience some tilting in its reciprocating movement causing a "piston slap" condition. In order to prevent this, the invention provides diametrically opposed axially elongated guide portions 440 and 442 preferably integrally formed in body 226g. The location of such, as viewed in FIG. 21, would be angularly between the axis of the wrist pin journals 418 and 420 and would depend downwardly from the main piston body 226g as generally depicted in FIG. 23. In the preferred form, guide members 440 and 442 are respectively provided with flat outer guide surfaces 444 and 446 with such being parallel to each other and parallel to the axis of piston body 226g.

With reference to FIG. 18, it can be seen that suitable sliding block or fixed guide means 448 and 450 are carried by the engine housing section 18g. In the preferred form guide means 448 and 450 are respectively provided with flat guide surfaces 452 and 454 for respective sliding engagement with slidable or moving guide surfaces 444 and 446 of piston means 422. Such relatively fixed guide members 448 and 450 are preferably axially adjustable (as by threadable engagement with housing section 18g, or the like) thereby being able to affect accurate operative engagement with surfaces 444 and 446 of guide portions 440 and 442; also, suitable sealing means, as at 456, is provided to effectively prevent leakage from precompression chamber means 190g. Further, suitable locking means as, for example, threaded lock plugs or the like, as depicted at 458 and 460, may be employed for retaining the guide means 448 and 450 in any selected position. As should be apparent, especially from FIG. 18, if there is any tendency of piston 422 to experience any tilting about the axis of the wrist pins 80g and 82g during its reciprocating movement, such is slidably constrained by the coaction of guide surfaces 444 and 452, on one side, and guide surfaces 446 and 454 on the other side.

The engine crank housing section 18g is also preferably provided with interconnected oil reservoir chambers 462 and 464 and, further, housing section 18g may be provided as with one or more oil drain or return passages 432 enabling such lubricating oil as is wiped from the piston and/or cylinder walls to be returned to the reservoir means of chambers 462 and 464. Further, an oil check aperture and plug means 466 may be provided as at an elevation slightly above the predetermined maximum oil level within chamber or reservoir means 462, 464. Obviously, if a pressurized or forced system of lubricating oil is desired such may be provided by any suitable means as, for example, disclosed in connection with FIG. 7.

The overall operation of the engine is as that discussed and described with reference to the previously embodiments and the engine of FIGS. 17-23 may, of course, be further modified in the manner that the hereinbefore disclosed embodiments were modified.

FIGS. 24–29 are related to the embodiment of FIGS. 17–23 and in particular to the piston means disclosed in FIGS. 21–23. Each of the FIGS. 24–29 are simplified generally schematic representations of various forms which the piston means 422 of FIGS. 17–23 may assume. Accordingly, for ease of discussion and presentation such elements as are: (a) depicted in FIGS. 24 and 25 and are like or similar to those of FIGS. 17-23 are identified with like reference numbers provided with a suffix "h"; (b) depicted in FIGS. 26 and 27 and are like or similar to those of FIGS. 17–23 are identified with like reference numbers provided with a suffix "j" and (c) depicted in FIGS. 28 and 29 and are like or similar to those of FIGS. 17–23 are identified with like reference numbers provided with a suffix "k".

In considering the various piston configurations of FIGS. 24–29 it can be seen that ring piston means 422h is not provided with any "anti-piston-slap" guide means and, therefore, if this form of ring piston is employed, the side thrust created by the rotating connecting rods will induce related side thrusts into the piston body thereby urging the ring piston 422h to experience the condition of "piston-slap".

The embodiment of ring piston 422j depicted in FIGS. 26 and 27 corresponds to that of piston 422, and related guiding structure, depicted in FIGS. 17-23. In FIG. 27, the area depicted at 468 is intended to represent the sliding contact area presented by guide member 450j against the moving guide 442j. A similar area would, of course, be determined by guide member 448j as against moving guide 440j.

Ring piston means 422k of FIGS. 28 and 29 is similar to that of FIGS. 26 and 27 and FIGS. 17–23. That is, piston means 422k is provided with a pair of extensions 470 and 472 respectively carried by and depending from the connecting rod bearing or journal portions 418k and 420k. Extension 470 is provided with oppositely disposed parallel guide surfaces 474 and 476 while extension 472 is similarly provided with oppositely disposed parallel guide surfaces 478 and 480. Similar to the arrangement of FIGS. 26 and 27, a first pair of opposed fixed sliding guide members 482 and 484 are respectively in abutting sliding engagement with movable sliding guide surfaces 474 and 476 while a second pair of opposed fixed sliding guide members 486 and 488 are respectively in abutting sliding engagement with movable sliding guide surfaces 478 and 480. In FIG. 29, the area depicted at 490 is intended to represent the sliding contact area presented by guide member 484 against the moving guide surface 476 of guide or extension 470 while the area depicted at 492 is intended to represent the sliding contact area presented by guide member 488 against the moving guide surface 480 of guide or extension 472. Similar areas would, of course, be respectively determined by guide members 482 and 486 against the opposite moving guide surfaces 474 and 478 of extensions 470 and 472.

FIGS. 30, 31 and 32 illustrate in simplified manner how the invention as exemplified by FIGS. 17–20 may, in effect, be combined as to become, instead of a single piston engine, one which is a multi-piston engine. In FIGS. 30, 31 and 32 elements to which reference is made and which are functionally like or similar to those of FIGS. 17-20 are identified with like reference numbers provided with, in FIG. 30, a suffix "m"; in FIG. 31, a suffix "n" and in FIG. 32 a suffix "p". As should be readily apparent. FIG. 30 is clearly a simplified illustration of the piston means, crankshaft means and output shaft means disclosed in FIGS. 17–20; further, if desired, suitable flywheel means as generally depicted at 494 may be provided. As will become even more apparent, when comparing FIGS. 30, 31 and 32, the arrangement of FIG. 30 (based on FIGS. 17 and 18) may be considered an engine module in that it can be employed to construct a modular overall engine using, in effect, multiples of the arrangement of FIG. 30. In viewing FIG. 31, it can be seen that the structure or arrangement represented thereby actually comprises two of the arrangements shown in FIG. 30. Suitable gear means 496 and 498 respectively fixedly secured to the parallel crankshaft means 28n—28n coact with output gear means 500 fixedly carried by the output shaft means 38n.

If an engine of four cylinders were to be desired, the arrangement could be that as depicted in FIG. 32. It will be noted that such is in effect twice the multiple or two cylinder engine of FIG. 31. In such arrangement, the only difference is that output shaft means 38p is made longer as compared to 38n of FIG. 31.

Figure 33:
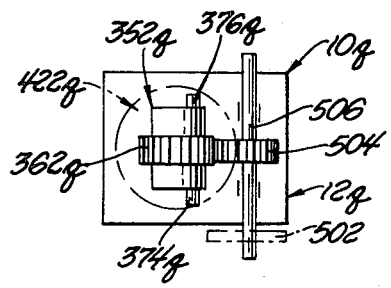
FIG. 33 is a generally schematic representation of a single cylinder engine of the invention employing a gearing arrangement and output means as depicted in FIGS. 14, 12 and 13.
Figure 34:
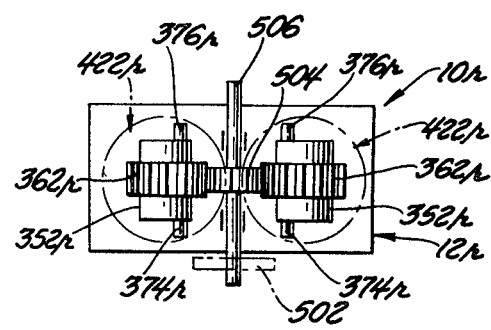
FIG. 34 is a generally schematic representation of two cylinders operatively connected to common gearing means based generally on that of FIG. 33.
Figure 35:
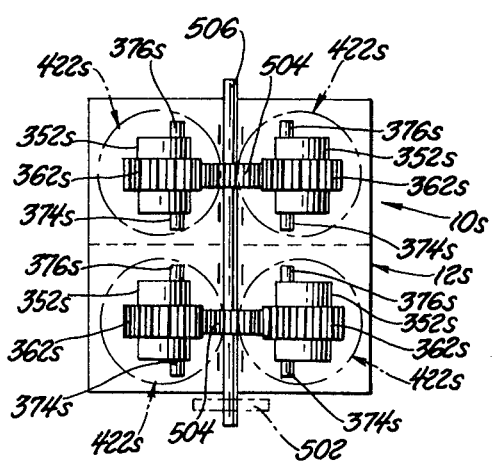
FIG. 35 is a generably schematic representation of four cylinders operatively connected as to the common gearing as depicted generally in FIG. 14.

FIGS. 33, 34 and 35 illustrate in simplified manner how the invention as depicted in FIGS. 12 and 13 may be combined with, for example, the invention as depicted in FIGS. 17 and 18. That is, following the concept of a single crankshaft means for a related ring piston, as generally set forth in FIGS. 17 and 18, such single crankshaft means may take the form of the crankshaft of FIGS. 12 and 13 wherein a gear is fixedly carried by or formed integrally with the crankshaft. Such, in turn, may be combined as to become, instead of a single piston engine, one which is a multi-cylinder engine. In FIGS. 33, 34 and 35 elements which are disclosed and which are functionally like or similar to those of FIGS. 12 and 13 and/or FIGS. 17 and 18 are identified with like reference numbers provided with, in FIG. 33, a suffix "q"; in FIG. 34, a suffix "r" and in FIG. 35 a suffix "s".

With reference to FIG. 33, it can be seen that the single crankshaft and gear 362q are operatively engaged with output gear means 504 operatively secured to associated output shaft means 506 which, if desired, may be provided with flywheel means 502. Further, upon comparing FIGS. 33, 34 and 35, it will be apparent that the arrangement depicted in FIG. 33 may be considered a single engine module in that it can be employed to construct the modular engines of FIGS. 34 and 35.

In viewing FIG. 34, it can be seen that the structure or arrangement represented thereby actually comprises two of the arrangements shown in FIG. 33 except that only a single output shaft 506 and single gear means 504 are required.

If an engine of four cylinders were to be desired, the arrangement could be that as depicted in FIG. 35. It will be noted that such is in effect twice the multiple or two cylinder engine of FIG. 34. In such an arrangement, the only difference is that the output shaft means 506 is made longer than that in FIG. 34.

Alignment of Ring Piston

It has been discovered that problems are encountered in obtaining proper working alignment as between a ring piston and its cooperating ring cylinder walls. Generally, in comparison, a plain or solid full top piston of the prior art, operating in a conventional full bore cylinder, is somewhat self-aligning in that the piston is always slightly smaller in diameter than the cooperating cylinder bore. Therefore, the prior art non-ring solid piston has the freedom of slightly shifting, from side to side; this general transverse or lateral shifting of the prior art piston is what permits the tendency of oocurrence of "piston slap". However, such tendency for "piston slap" and attendant tendency for piston seizure within the cylinder can be overcome by the proper selection of relative diametric dimensional tolerances, sufficient lubrication and piston rings of adequate flexibility.

Generally, in contrast to the prior art, the ring piston of the invention, under like circumstances, will also be subjected to the possibility of binding and seizing within the ring or annular cylinder. Further, the ring piston of the invention is concerned with inner and outer diameters not only of itself but also of the cooperating annular cylinder. Such diameters, as a practical matter, will never be manufactured to the accuracy of being perfectly concentric to each other.

As will become apparent, the invention provides for a method by which the various diameters of the ring piston and cooperating ring or annular cylinder can be arranged or determined as to prevent the ring piston from experiencing "piston slap" and related seizing within the annular cylinder.

FIGS. 36 and 37 are somewhat simplified or schematic illustrations typically illustrating structure defining the ring piston and cooperating annular cylinder. The structure depicted in FIGS. 36 and 37 finds its functional equivalent in each of the embodiments of the invention hereinbefore described; however, merely for ease of functional identification, elements in FIGS. 36 and 37 functionally corresponding to those of, for example, FIGS. 17 and 18 are identified with like reference numbers and like suffixes, if any; only so much of the structure is disclosed in FIGS. 36 and 37 as is believed necessary to fully explain the method involved.

For purposes of explanation, let the following be assumed and/or established. The diameter of the outer surface 160g of the piston 422 is represented by the dimensional arrow, X, in FIG. 36 and such piston 422 is assumed to be, generally laterally, shifted to the left, as viewed in either FIGS. 36 or 37, as to be tangent at the extreme left to the outer cylindrical surface 162g of the coacting annular cylinder. The true, assumed perfect, centerline of the outer cylindrical surface 162g, of the annular cylinder, is depicted by centerline 510. The true centerline of the outer diameter of the piston 422, also shifted to the left to correspond to the shifted condition of piston 422, is depicted by centerline 512.

The diameter of the outer cylindrical surface 122g of the afterburner means 102g, which is actually the inner cylindrical surface of the annular cylinder, is represented by the dimensional arrow, Y, in FIG. 36 and, to establish the worst possible condition, let it be assumed that, in installation of the afterburner means 102g, such inner cylindrical surface 122g is shifted to the right (as viewed in either FIG. 36 or 37) as to have its true centerline correspondingly shifted to the right (with respect to centerline 510) and represented as by centerline 514. The total difference between diameters X and 162g results in and is depicted by gap A in both FIGS. 36 and 37. In order to prevent a binding or seizing from occurring as between the inner cylindrical surface 124g of piston 422 and the outer cylindrical surface 122g of the annular cylinder, a minimal gap B is established. Accordingly, when the minimum values for gap A and B are established, gap C (giving due consideration to the dimensional tolerances for A and B) should be made equal to the sum total of the maximum values for such gaps A and B. By in this manner establishing the various clearances and gaps it can be assured that the inner cylindrical surface 124g, of piston 422, and the inner cylindrical surface 122g, of reactor or afterburner body 144g, will not come into contact with each other regardless of any general lateral shifting of piston 422 within the annular cylinder.

With reference to FIG. 37, it can be seen that when ring piston 422 has moved or shifted fully to the left as to be tangent to the outer cylindrical wall 162g, the resulting gaps A, B and C vary considerably in dimension. The plurality of free-floating piston rings function to sealingly prevent compression losses through such gaps (which, of course, are crescent shaped or unequally annular when viewed in FIG. 36).

In the preferred form, three axially spaced piston rings 148g, 150g and 152g are provided for affecting a seal as between the outer diameter of piston 422 and the outer wall 162g of the annular cylinder. Such piston rings are of the self-expanding type and the arrows depicted thereon indicate the direction of pressure or resilient force exerted by the piston rings against the outer cylinder wall 162g and, as through inertia, downwardly against the coacting piston ring grooves as when the piston is in its upward movement. The coacting piston ring grooves 154g, 156g and 158g are of sufficient radial depth to provide for sufficient freedom of radial motion of the piston rings to compensate for the gap A and its relative location.

The inner diameter of piston 422 is provided with annular piston ring grooves 132g and 134g which respectively receive piston rings 128g and 130g which are of the self-closing type and therefore effective for continually sealingly engaging the inner cylindrical surface 122g of the afterburner means 102g. The arrows depicted on such piston rings 128g and 130g indicate the direction of pressure or resilient force exerted by the piston rings against the inner cylindrical wall 122g, of the annular cylinder, and, as through inertia, downwardly against the coacting piston ring grooves as when the piston is in its upward directed movement. Piston ring grooves 132g and 134g are provided with a radial depth sufficient to enable adequate freedom of relative radial movement of piston rings 128g and 130g to compensate and cover the gap C regardless of the relative location thereof.

The lower end of afterburner housing or body means 114g is provided with at least one piston ring groove 128g (two being illustrated) which receives a piston ring 126g (a piston ring being shown in each groove 128g). Such piston ring means 126g may be of the conventional expandable type and the arrows depicted thereon indicate the direction of pressure or resilient force exerted thereby and against the inner cylindrical surface 124g of piston 422 and, as through inertia, upwardly against the coacting piston ring groove means 128g as when the piston is in its upward directed movement. The piston ring groove means 128g is provided with a radial depth sufficient to provide for adequate freedom of relative radial movement of piston ring means 126g to assure continued sealing contact with surface 124g regardless of the location of gap C.

The use of an afterburner means or section directly as the center core of an annular or ring cylinder engine of the invention can further be enhanced by consideration of heat, heat flows and coefficients of thermal expansion. That is, it may be because of selection of materials and/or particular configurations, that neither the thermal coefficient of expansion for all cooperating elements nor the actual total expansion thereof will be equal. This becomes especially evident when one considers the two relatively more crucial components as the outer cylinder wall structure and the inner situated afterburner section or housing wherein both diameters and axial lengths are different, and, wherein the materials are different. In the embodiments disclosed, in order to maintain a steady or constant relationship, such components as the afterburner housing or body and the outer cylinder wall structure must be firmly and securely clamped as between opposed upper and lower housing means or sections. However, with continued engine operation and attendant increases in heat, the percentage distribution of such heat in the direction of the outer cylinder wall, as compared to the inner afterburner section, could become very great. If especially, for example, the thermal coefficient of expansion for such components was different, it can be seen that the two components would linearly expand at different rates per degree of temperature rise thereby possibly causing stress damage to one or both of the components as well as possibly causing a loss of sealing contact as with the surfaces between which the components were originally clamped.

It is further contemplated that the useful life of the inner cylindrical wall of the ring cylinder could be somewhat impaired by being exposed as to the peak combustion temperatures within the cylinder combustion chamber. More particularly, and as already presented, the afterburner body or section is exposed to the combustion occurring in the combustion chamber and the combusted gases are exhausted inwardly into the afterburner chamber where the temperatures are still relatively high and such continued high temperature both externally and internally of the afterburner body could cause thermal damage to the afterburner body and in particular to the inner cylindrical wall carried or formed thereby. Therefore, generally, the invention further contemplates provisions for obviating any such possible detrimental heat effects and whereby the useful life of the afterburner section and cylinder wall carried thereby can be substantially enhanced and extended.

Figure 38:
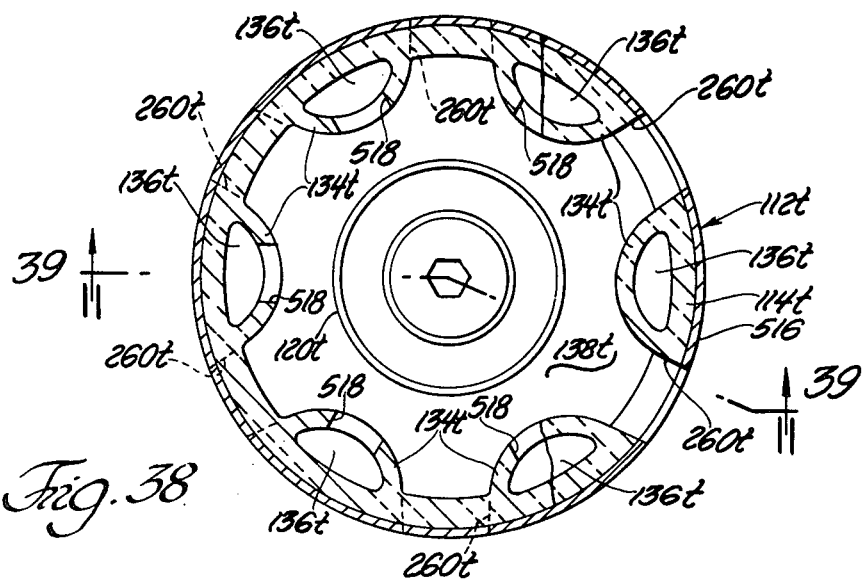
FIG. 38 is a somewhat enlarged transverse cross-sectional view of an afterburner section taken generally on the plane of line 38—38 of FIG. 39 and looking in the direction of the arrows.
Figure 39:
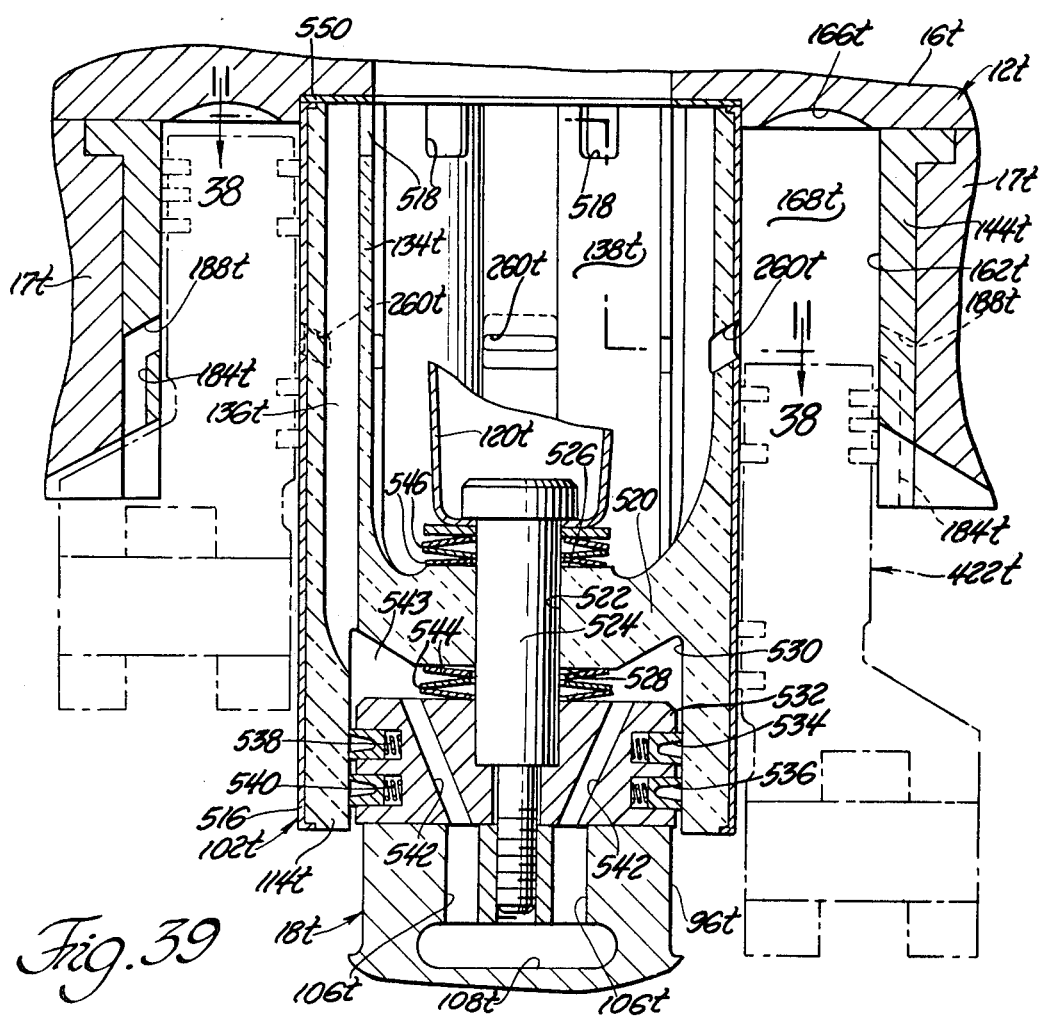
FIG. 39 is a fragmentary cross-sectional view of the afterburner means taken generally on the plane of line 39—39 of FIG. 38 and looking in the direction of the arrows.

FIGS. 38 and 39 illustrate such further contemplated modifications to the invention. All elements in FIGS. 38 and 39 which are like or similar to those of FIGS. 4 and/or 17 and 18 are identified with like reference numerals provided with a suffix "t".

Referring in greater detail to FIGS. 38 and 39, in the preferred form thereof afterburner body means 114t is formed of a ceramic material of high heat resistance and relatively high strength. Preferably, the exterior of body 114t is provided with a secondary ceramic coacting 516 which has a still greater resistance to abrassion after being properly fired. As a contemplated alternative, the coating or outer layer 516 may be replaced by a high heat resistant metal sleeve which can be ground and honed for improving the subsequent lubrication thereof and sliding of the piston assembly thereagainst.

As shown in FIG. 39, preferably, the outer layer 516 covers the entire length of the afterburner body means 114t. The plurality of equally spaced vertically extending conduits or passages 136t are each provided with an upper disposed opening 518 directed toward the afterburner chamber means 138t. Preferably, the afterburner body section 114t is symmetrically shaped in such a manner as to enable the casting and firing of it, as a ceramic article, with little if any distortion. An end portion 520 is integrally formed in the generally lower portion of body 114t and is provided with a through passage 522 for the reception of a shouldered retaining screw or bolt 524. Preferably the axially opposed ends of end portion 520 are respectively provided with flat end faces or surfaces 526 and 528. Downwardly of end wall portion 520, the body 114t extends as to define a generally internal tubular opening 530 which, in turn, receives an insertable closure wall 532 which, in the preferred form, is of disc-like or cylindrical configuration. A plurality of sealing rings 534 and 536 respectively carried within annular grooves in closure wall 532, and assisted as by spring means 538 and 540, serve to seal against any leakage flow as between the chamber 530 and closure 532. As shown, preferably, the shoulder portion of screw or bolt 524, piloted within end closure 532, axially urges the closure member 532 tightly against the top of portion 96t thereby placing passage means 542 in communication with passage means 106t to thereby communicate the air from passage 108t to the generally annular chamber 543 existing between end wall portion 520 and end closure member 532.

A first plurality of spring means, such as Belleville type springs 544, is provided generally about bolt 524 and between end wall portion 520 and end closure member 532 while a second plurality of spring means, such as Belleville type springs 546, is provided generally about bolt 524 and between, functionally, the head of bolt 524 and end wall portion 520.

The afterburner assembly 102t, as above described, is first assembled to portion 96t of the engine crankcase housing section 18t before the ring piston 422t is installed. After such installation of the afterburner means 102t, the ring piston 422t, which may have a plurality of upper situated inner piston rings and a plurality of lower situated inner piston rings, is installed and operatively connected to the related connecting rods. After the ring piston is thusly installed, the outer cylinder wall structure 144t and outer housing section 17t are, preferably, then assembled onto lower disposed housing section 18t and secured thereto. A suitable sealing gasket means 550 is situated atop the afterburner means 102t and the head-like housing section 16t is then situated over and against the gasket or seal 550 as well as operatively over and against outer cylinder wall member 144t and outer engine housing section 17t and operatively secured thereto thereby resulting in a bolted or secured assembly as generally depicted in FIG. 39.

As a consequence of the arrangement depicted in FIG. 39, any time engine housing section 17t becomes sufficiently heated and thermally expands to its thermal limit, the head-like engine section 16t will rise by the same amount as had the housing section 17t expanded. However, such expansion and rising motions of such elements are compensated for by the structure of FIG. 39. That is, the preload force of lower disposed spring means 544 is sufficient to overcome the frictional force of the piston rings against afterburner means 102t tending to move the afterburner means downwardly and sufficient to continually maintain the upper end of the afterburner means 102t in sealing engagement with head-like engine housing section 16t. The upper situated spring means 546 is significantly weaker having a significantly greater spring rate than the lower spring means 544. The purpose of such upper spring means 546 is to provide for self-adjustment for the afterburner body means 114t in regard to its own slight changes in length due to its thermal coefficient of expansion.

Figure 40:
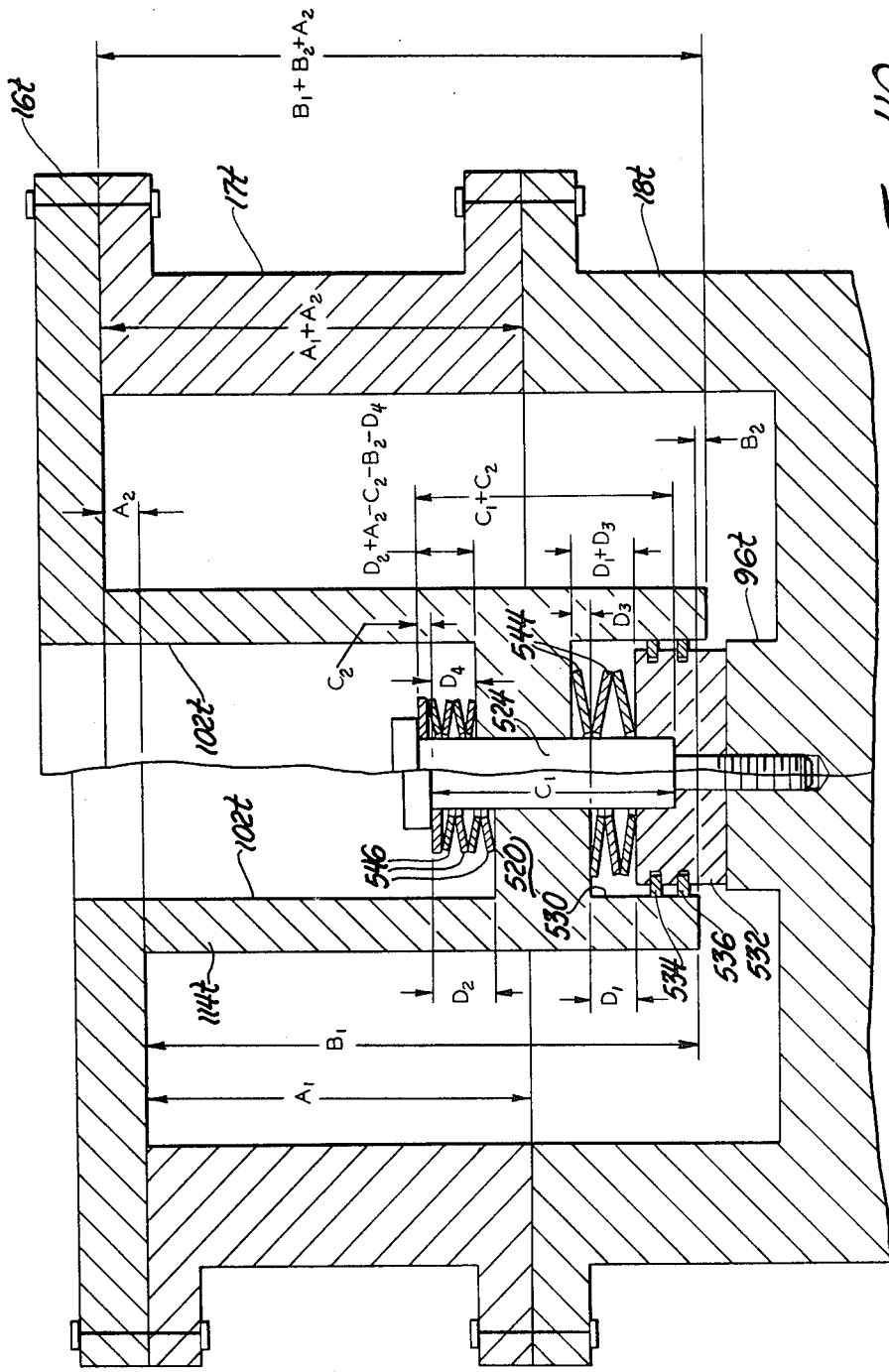
FIG. 40 is a generally schematic illustration of the differences of component-elongation-factors due to variables in the coefficient of thermal expansion per degree Fahrenheit (°F.) which are overcome by the invention.

FIG. 40 is a simplified illustration of a portion of the structure shown in FIG. 39 with the purpose thereof to visually illustrate the interaction of the various components of FIGS. 39 and 40 as compared to cold and hot engine conditions. For purposes of orientation, the simplified elements of FIG. 40 as correspond to elements of FIG. 39 are identified with like reference numerals and like suffixes, if any.

Referring in greater detail to FIG. 40, the illustration at the left half thereof and the dimensions appearing also at the left half thereof represent the conditions experienced when the engine is cold while the illustration at the right half thereof and the dimensions appearing also at the right half thereof represent the conditions experienced when the engine is hot or at normal engine operating temperature.

Let it be assumed that when the engine is cold the height dimensions of the following identified elements are:

| Element | Dimension |
|---|---|
| Engine housing section 17t | $A_1$ |
| Afterburner body means 114t | $B_1$ |
| Pilot shank length of bolt 524 | $C_1$ |
| Effective height of spring means 544 | $D_1$ |
| Effective height of spring means 546 | $D_2$ |

Let it be further assumed that when the engine has attained its normal operating temperature the above-identified elements have become heated and have undergone the following amount of thermal expansion:

| Element | Expansion |
|---|---|
| Engine housing section 17t | $A_2$ |
| Afterburner body means 114t | $B_2 + A_2$ |
| Pilot shank length of bolt 524 | $C_2$ |
| Changed height of spring means 544 | $D_3$ |
| Change in height of spring means 546 | $D_4$ |

Accordingly, in view of the above assumptions, it is apparent that when the engine has attained its normal operating temperature the new "hot" height dimensions for the same elements will be:

| Element | Dimension |
|---|---|
| Engine housing section 17t | $A_1 + A_2$ |
| Afterburner body means 114t | $B_1 + B_2 + A_2$ |
| Pilot shank length of bolt 524 | $C_1 + C_2$ |
| Effective height of spring means 544 | $D_1 + D_3$ |
| Effective height of spring means 546 | $D_2 + A_2 - C_2 - B_2 - D_4$ |

The reaction force of the lower spring means 544 must be sufficient to at all times maintain the upper edge or end of the afterburner body means 114t in its proper sealing condition with respect to engine housing section 16t and, simultaneously, compensate for the action of the upper situated spring means 546 for the entire range of dimensional changes in the system. Any minute sliding-like action of the inner surface 530 of afterburner body means 114t, due to its own thermal expansion and/or contraction, will be permitted by the annular seals 534 and 536 without loss of sealing integrity therebetween.

The benefits derived from the arrangement depicted by FIGS. 39 and 40 become even more apparent when, for example, a relatively large engine is considered. For example, let it be assumed that the afterburner housing or body means 114t is formed from a high strength oxidation resistant and heat resistant chromium-nickel steel, of the HH alloy Type I, partially ferrite, wherein the mean coefficient of linear thermal expansion is 11.0 micro-inches per degree Fahrenheit. If then the temperature thereof is elevated from 70° F. to 1850° F., such would represent a total temperature rise of 1780° F. Therefore, the afterburner body means 114t would experience an elongation or expansion of (1780°) (0.000011 micro-inches/degree) or an expansion of 0.019580 micro-inches for each inch in length. If, for purposes of illustration, the afterburner body means 114t had a total length of 10.0 inches, then the thermal expansion would cause the afterburner body to have its overall length increased to 10.1958 inches. If the afterburner body were to have a cold overall length of 30.0 inches, then such, when hot, would be increased to 30.5874 inches or a total expansion of 0.5874 inch.

If it is assumed that the outer engine housing section 17t is water cooled, it may never experience temperatures in excess of, for example, 300° F. With such an assumption, it can be seen that if constructed of material of like or closely related coefficient of thermal expansion, that if heated from 70° F. to 300° F., it would experience an expansion of only (230°) (11.0 microinches/degree) or an expansion of 0.00253 inches for each inch of its length.

If it is assumed that the cold length of the afterburner body means 114t is 30.00 inches and that the cold length of the engine housing section 17t is 20.00 inches it can be seen that upon attaining engine operating temperature and having the elements fully expand, the increased length of afterburner body means 114t would be 0.5874 inch while the increased length of the engine housing section 17t would be 0.0506 inch, thereby resulting in a difference of 0.5368 inch which, with the invention as disclosed in FIGS. 39 and 40, is compensated for.

It should be mentioned that various ceramics may be employed. For example, all ceramics of the alumina fused, alumina hydrated, silicon carbide, reaction-bonded silicon nitrides, hot pressed silicon nitride or sintered nitride types are but a few of the ceramic materials employable in practicing the teachings of the invention.

Although the invention has been disclosed in its preferred embodiment and a select number of variations and other embodiments and modifications of the invention, it is apparent that other embodiments and modifications of the invention are possible within the scope of the appended claims.

What is claimed is:

1. An internal combustion engine, comprising engine housing means, a first annular cylinder with a first combustion chamber formed in said engine housing means, said first annular cylinder comprising a first radially inner annular wall and a first radially outer annular wall, a first ring-like piston received in said first annular cylinder for reciprocating movement therein, first motion transmitting means operatively connected to said first ring-like piston for transmitting the power developed by the reciprocating movement of said first ring-like piston to associated output power consuming means, said first motion transmitting means comprising first crankshaft means and first connecting rod means, said first connecting rod means being effective for operatively interconnecting said first ring-like piston to said first crankshaft means, said first crankshaft means comprising a first large diameter live bearing portion journalled within said engine housing means, said first connecting rod means comprising at least first and second connecting rods, said first connecting rod being operatively connected to said first crankshaft means at a first axial end of said first large diameter live bearing portion, said second connecting rod being operatively connected to said first crankshaft means at a second axial end of said first large diameter live bearing portion opposite to said first axial end, a second annular cylinder with a second combustion chamber formed in said engine housing means, said second annular cylinder comprising a second radially inner annular wall and a second radially outer annular wall, a second ring-like piston received in said second annular cylinder for reciprocating movement therein, second motion transmitting means operatively connected to said second ring-like piston for transmitting the power developed by the reciprocating movement of said second ring-like piston to said associated output power consuming means, said second motion transmitting means comprising second crankshaft means and second connecting rod means, said second connecting rod means being effective for operatively interconnecting said second ring-like piston to said second crankshaft means, said second crankshaft means comprising a second large diameter live bearing portion journalled within said engine housing means, said second connecting rod means comprising at least third and fourth connecting rods, said third connecting rod being operatively connected to said second crankshaft means at a first axial end of said second large diameter live bearing portion, and said fourth connecting rod being operatively connected to said second crankshaft means at a second axial end of said second large diameter live bearing portion opposite to said first axial end of said second large diameter live bearing portion.

2. An internal combustion engine according to claim 1 and further comprising first gear means operatively connected to said first crankshaft means, second gear means operatively connected to said second crankshaft means, and power output shaft means operatively driven conjointly by said first and second gear means.

3. An internal combustion engine according to claim 1 and further comprising single gear means conjointly driven by said first and second crankshaft means, and power output shaft means rotatably driven by said single gear means.

4. An internal combustion engine according to claim 3 wherein said first and second crankshaft means are in axial alignment with each other, and wherein said single gear means is operatively interposed axially generally between said first and second crankshaft means.

5. An internal combustion engine according to claim 1 and further comprising first afterburner means situated generally radially inwardly of said first annular cylinder and in operative communication with ambient atmosphere, first exhaust passage means communicating between said first combustion chamber and said radially inwardly situated first afterburner means, said first afterburner means being effective to receive exhaust gases from said first combustion chamber through said first exhaust passage means and to enable further continued combustion of said exhaust gases within said first afterburner means before discharging said exhaust gases to said ambient atmosphere, second afterburner means situated generally radially inwardly of said second annular cylinder and in operative communication with ambient atmosphere, second exhaust passage means communicating between said second combustion chamber and said radially inwardly situated second afterburner means, said second afterburner means being effective to receive exhaust gases from said second combustion chamber through said second exhaust passage means and to enable further continued combustion thereof within said second afterburner means before discharge thereof to said ambient atmosphere.

6. An internal combustion engine according to claim 1 and further comprising first gear means carried by said first large diameter live bearing portion and effective for transmitting power from said first crankshaft means, second gear means carried by said second large diameter live bearing portion and effective for transmitting power from said second crankshaft means, and power output shaft means operatively engaged with and driven by both of said first and second gear means.

7. An internal combustion engine according to claim 6 and further comprising first afterburner means situated generally radially inwardly of said first annular cylinder and in operative communication with ambient atmosphere, first exhaust passage means communicating between said first combustion chamber and said radially inwardly situated first afterburner means, said first afterburner means being effective to receive exhaust gases from said first combustion chamber through said first exhaust passage means and to enable further continued combustion of said exhaust gases within said first afterburner means before discharging said exhaust gases to said ambient atmosphere, second afterburner means situated generally radially inwardly of said second annular cylinder and in operative communication with ambient atmosphere, second exhaust passage means communicating between said second combustion chamber and said radially inwardly situated second afterburner means, said second afterburner means being effective to receive exhaust gases from said second combustion chamber through said second exhaust passage means and to enable further continued combustion thereof within said second afterburner means before discharge thereof to said ambient atmosphere.

8. An internal combustion engine, comprising engine housing means, a first annular cylinder with a first combustion chamber formed in said engine housing means, said first annular cylinder comprising a first radially inner annular wall and a first radially outer annular wall, a first ring-like piston received in said first annular cylinder for reciprocating movement therein, first motion transmitting means operatively connected to said first ring-like piston for transmitting the power developed by the reciprocating movement of said first ring-like piston to associated output power consuming means, said first motion transmitting comprising first and second crankshaft means parallel to each other and first connecting rod means, said first connecting rod means being effective for operatively interconnecting said first ring-like piston to said first and second crankshaft means, said first crankshaft means comprising a first large diameter live bearing portion journalled within said engine housing means, said second crankshaft means comprising a second large diameter live bearing portion journalled within said engine housing means, said first connecting rod means comprising first second third and fourth connecting rods, said first connecting rod being operatively connected to said first crankshaft means at a first axial end of said first large diameter live bearing portion, said second connecting rod being operatively connected to said first crankshaft means at a second axial end of said first large diameter live bearing portion opposite to said first axial end, said third connecting rod being operatively connected to said second crankshaft means at a first axial end of said second large diameter live bearing portion, said fourth connecting rod being operatively connected to said second crankshaft means at a second axial end of said second large diameter live bearing portion opposite to said first axial end of said second large diameter live bearing portion, a second annular cylinder with a second combustion chamber formed in said engine housing means, said second annular cylinder comprising a second radially inner annular wall and a second radially outer annular wall, a second ring-like piston received in said second annular cylinder for reciprocating movement therein, second motion transmitting means operatively connected to said second ring-like piston for transmitting the power developed by the reciprocating movement of said second ring-like piston to said associated output power consuming means, said second motion transmitting means comprising third and fourth crankshaft means parallel to each other and second connecting rod means, said second connecting rod means being effective for operatively interconnecting said second ring-like piston to said third and fourth crankshaft means, said third crankshaft means comprising a third large diameter live bearing portion journalled within said engine housing means, said fourth crankshaft means comprising a fourth large diameter live bearing portion journalled within said engine housing means, said second connecting rod means comprising fifth sixth seventh and eighth connecting rods, said fifth connecting rod being operatively connected to said third crankshaft means at a first axial end of said third large diameter live bearing portion, said sixth connecting rod being operatively connected to said third crankshaft means at a second axial end of said third large diameter live bearing portion opposite to said first axial end of said third large diameter live bearing portion, said seventh connecting rod being operatively connected to said fourth crankshaft means at a first axial end of said fourth large diameter bearing portion, said eighth connecting rod being operatively connected to said fourth crankshaft means at a second axial end of said fourth large diameter live bearing portion opposite to said first axial end of said fourth large diameter live bearing portion, first gear means carried by said first large diameter live bearing portion, second gear means carried by said second large diameter live bearing portion, third gear means carried by said third large diameter live bearing portion, fourth gear means carried by said fourth large diameter live bearing portion, said first and second gear means being in operative engagement, said third and fourth gear means being in operative engagement, and power output shaft means, said output shaft means comprising fifth and sixth gear means, said fifth gear means being in operative engagement with at least one of said first and second gear means, and said sixth gear means being in operative engagement with at least one of said third and fourth gear means.

9. An internal combustion engine according to claim 8 and further comprising first afterburner means situated generally radially inwardly of said first annular cylinder and in operative communication with ambient atmosphere, first exhaust passage means communicating between said first combustion chamber and said radially inwardly situated first afterburner means, said first afterburner means being effective to receive exhaust gases from said first combustion chamber through said first exhaust passage means and to enable further continued combustion of said exhaust gases within said first afterburner means before discharging said exhaust gases to said ambient atmosphere, second afterburner means situated generally radially inwardly of said second annular cylinder and in operative communication with ambient atmosphere, second exhaust passage means communicating between said second combustion chamber and said radially inwardly situated second afterburner means, said second afterburner means being effective to receive exhaust gases from said second combustion chamber through said second exhaust passage means and to enable further continued combustion thereof within said second afterburner means before discharge thereof to said ambient atmosphere.

* * * * *

UNITED STATES PATENT AND TRADEMARK OFFICE
CERTIFICATE OF CORRECTION

PATENT NO. : 4,359,016
DATED : November 16, 1982
INVENTOR(S) : William V. Bachmann It is certified that error appears in the above—identified patent and that said Letters Patent is hereby corrected as shown below:

Column 2, lines 37 and 38, delete "with portions thereof broken away".

Column 4, line 49, change "dated" to --- dead ---.

Column 5, line 22, after "as to" insert --- be ---.

Column 8, line 39, after "caused" insert --- by ---.

Column 14, line 30, change "existance" to --- existence ---.

Column 16, line 48, change "losed" to --- closed ---.

Column 17, line 16, change " "d" " to --- "d" ---.

Column 20, line 58, after "as to" insert --- be ---.

Column 21, line 47, change "previously" to --- previous ---.

Column 21, line 60, change "h" to --- 1 ---.

UNITED STATES PATENT AND TRADEMARK OFFICE
CERTIFICATE OF CORRECTION

PATENT NO. : 4,359,016

DATED : November 16, 1982

INVENTOR(S) : William V. Bachmann

It is certified that error appears in the above—identified patent and that said Letters Patent is hereby corrected as shown below:

Column 21, line 67, change "422h" to --- 4221 ---.

Column 22, line 4, change "422h" to --- 4221 ---.

Column 22, line 49, immediately after "apparent", change the period to a comma.

Column 23, line 53, change "of oocur'" to --- or occur- ---.

Column 26, line 37, change "abrassion" to --- abrasion ---.

Signed and Sealed this

Twenty-first Day of August 1984

[SEAL]

Attest:

GERALD J. MOSSINGHOFF

Attesting Officer

Commissioner of Patents and Trademarks